(12) United States Patent
Park

(10) Patent No.: US 11,705,120 B2
(45) Date of Patent: Jul. 18, 2023

(54) ELECTRONIC DEVICE FOR PROVIDING GRAPHIC DATA BASED ON VOICE AND OPERATING METHOD THEREOF

(71) Applicant: Samsung Electronics Co., Ltd., Suwon-si (KR)

(72) Inventor: Miji Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/784,994

(22) Filed: Feb. 7, 2020

(65) Prior Publication Data

US 2020/0258517 A1 Aug. 13, 2020

(30) Foreign Application Priority Data

Feb. 8, 2019 (KR) .......................... 10-2019-0014834

(51) Int. Cl.
*G10L 15/22* (2006.01)
*G06F 3/041* (2006.01)
(Continued)

(52) U.S. Cl.
CPC .............. *G10L 15/22* (2013.01); *G06F 3/041* (2013.01); *G06F 3/0482* (2013.01); *G06F 3/04842* (2013.01)

(58) Field of Classification Search
CPC ......... G10L 15/22; G10L 15/02; G10L 15/04; G10L 21/10; G06F 3/041; G06F 3/0482;
(Continued)

(56) References Cited

U.S. PATENT DOCUMENTS 8,261,231 B1* 9/2012 Hirsch ...................... G06F 8/30
717/100
8,861,005 B2 10/2014 Grosz
(Continued)

FOREIGN PATENT DOCUMENTS

CN 111556335 A * 8/2020
EP 2 960 816 A1 12/2015
(Continued)

OTHER PUBLICATIONS

Ana Gotter. "Instagram Stickers: The Underrated Feature That Can Take Your Stories Further" Sep. 27, 2018, pp. 1-13; "https://www.shopify.com/blog/instagram-stickers" (Year: 2018).*
(Continued)

*Primary Examiner* — Shen Shiau
(74) *Attorney, Agent, or Firm* — Jefferson IP Law, LLP

(57) ABSTRACT

An electronic device for providing graphic data based on a voice, and an operation method therefor are provided. The electronic device includes a display, and a processor, and the processor is configured to obtain at least one keyword from a voice signal related to a plurality of images, determine at least one graphic data corresponding to the at least one keyword, select at least one of the plurality of images, based on a point in time at which a voice corresponding to a keyword that corresponds to the determined graphic data is output, and perform control so as to apply the determined graphic data to the at least one selected image.

11 Claims, 21 Drawing Sheets

(51) Int. Cl.
G06F 3/04842 (2022.01)
G06F 3/0482 (2013.01)

(58) Field of Classification Search
CPC .... G06F 3/04842; G06F 3/167; G06F 40/279;
G06F 3/0481; G06F 3/0486; H04L 51/04;
H04N 21/4394; H04N 21/8547
See application file for complete search history.

(56) References Cited

U.S. PATENT DOCUMENTS

| | | | |
|---|---|---|---|
| 9,420,227 | B1 | 8/2016 | Shires et al. |
| 9,613,627 | B2* | 4/2017 | Park .................. H04M 1/72433 |
| 9,697,235 | B2* | 7/2017 | Bastaldo-Tsampalis ..................... G06F 16/5838 |
| 9,800,950 | B2* | 10/2017 | Grevers, Jr. ....... H04N 21/2668 |
| 10,270,983 | B1* | 4/2019 | Van Os ................ H04N 5/2621 |
| 10,691,717 | B2* | 6/2020 | Im .......................... G06F 16/26 |
| 10,788,900 | B1* | 9/2020 | Brendel ............... G06F 40/166 |
| 2004/0141714 | A1* | 7/2004 | Izume .................... H04N 5/772 386/230 |
| 2007/0260677 | A1* | 11/2007 | DeMarco ............. G06F 40/169 709/203 |
| 2007/0266304 | A1* | 11/2007 | Fletcher ............... G06F 40/169 715/230 |
| 2009/0083787 | A1 | 3/2009 | Morris |
| 2009/0150379 | A1 | 6/2009 | Park et al. |
| 2009/0210779 | A1* | 8/2009 | Badoiu ................. G06F 40/169 715/230 |
| 2012/0260232 | A1* | 10/2012 | Hirsch ....................... G06F 8/36 717/107 |
| 2013/0290859 | A1* | 10/2013 | Venkitaraman ...... H04N 21/254 715/744 |
| 2013/0298162 | A1 | 11/2013 | Cho et al. |
| 2014/0063317 | A1* | 3/2014 | Jung .................. H04N 5/23293 348/333.02 |
| 2014/0092424 | A1 | 4/2014 | Grosz |
| 2014/0278408 | A1* | 9/2014 | Park ....................... G06F 3/0488 704/235 |
| 2014/0289632 | A1* | 9/2014 | Suzuki ............... G06K 9/00664 715/728 |
| 2014/0325359 | A1* | 10/2014 | Vehovsky ............. G06F 3/0484 715/723 |
| 2014/0334797 | A1* | 11/2014 | Lee ........................ G11B 27/28 386/241 |
| 2014/0359656 | A1* | 12/2014 | Banica ................ H04N 21/234 725/32 |
| 2014/0368601 | A1* | 12/2014 | deCharms ............. H04L 67/26 348/14.02 |
| 2015/0019969 | A1* | 1/2015 | Lee .................... G06F 16/7834 715/719 |
| 2015/0042570 | A1* | 2/2015 | Lombardi ............. G06F 3/0488 345/173 |
| 2015/0163561 | A1* | 6/2015 | Grevers, Jr. ..... H04N 21/42203 704/235 |
| 2015/0347597 | A1 | 12/2015 | Kim et al. |
| 2016/0019239 | A1* | 1/2016 | Bastaldo-Tsampalis ..................... G06F 16/986 345/632 |
| 2016/0191958 | A1* | 6/2016 | Nauseef .................. G06V 40/20 725/116 |
| 2016/0286244 | A1* | 9/2016 | Chang ................ H04N 21/4788 |
| 2016/0379395 | A1* | 12/2016 | Sirpal .................. G06F 3/04847 715/727 |
| 2017/0331952 | A1* | 11/2017 | Rogers ................ H04L 65/1069 |
| 2018/0278674 | A1* | 9/2018 | Zhou ................... G06F 16/5866 |
| 2019/0028780 | A1* | 1/2019 | Prabhu ............. H04N 21/23106 |
| 2019/0080168 | A1* | 3/2019 | Nowak-Przygodzki ..................... G06F 3/0304 |
| 2019/0156826 | A1 | 5/2019 | Cromack |
| 2019/0261025 | A1* | 8/2019 | Hussain ................. H04N 21/44 |
| 2019/0331914 | A1* | 10/2019 | Lee ....................... G06F 3/0304 |
| 2020/0019812 | A1* | 1/2020 | Jin ..................... G06K 9/00684 |
| 2020/0106965 | A1* | 4/2020 | Malia .................... A63F 13/327 |
| 2020/0175975 | A1* | 6/2020 | Kong ..................... G06T 11/60 |
| 2020/0393915 | A1* | 12/2020 | Brendel ................ G06F 40/166 |

FOREIGN PATENT DOCUMENTS

| | | | |
|---|---|---|---|
| EP | 2960816 A1 * | 12/2015 | ............. G06F 16/48 |
| KR | 10-2007-0067284 A | 6/2007 | |
| KR | 10-2009-0005610 A | 1/2009 | |
| KR | 10-2014-0113156 A | 9/2014 | |
| KR | 10-2018-0092873 A | 8/2018 | |

OTHER PUBLICATIONS

Apple Support Communities, "Add emoji to your video in clips on iPhone, iPad, and iPod touch", Jan. 31, 2019, pp. 1-2; "https://web.archive.org/web/20190131070723/https://support.apple.com/en-us/HT207861" (Year: 2019).*

Snapchat Support, "Discover tips and tricks, find answers to common questions, and get help!", May 19, 2018, pp. 1-5; "https://web.archive.org/web/20180519002640/https://support.snapchat.com/en-US/a/creative-tools" (Year: 2018).*

International Search Report and Written Opinion dated May 22, 2020, issued in International Patent Application No. PCT/KR2020/001761.

European Search Report dated Jan. 28, 2022; European Appln. No. 20752833.2-1209 / 3906553 PCT/KR2020001761.

European Search Report dated May 18, 2022; European Appln. No. 20752833.2-1208 / 3906553 PCT/KR2020001761.

Korean Office Action with English translation dated Feb. 28, 2023; Korean Appln. No. 10-2019-0014834.

* cited by examiner

ELECTRONIC DEVICE FOR PROVIDING GRAPHIC DATA BASED ON VOICE AND OPERATING METHOD THEREOF

CROSS-REFERENCE TO RELATED APPLICATION(S)

This application is based on and claims priority under 35 U.S.C. § 119(a) of a Korean patent application number 10-2019-0014834, filed on Feb. 8, 2019, in the Korean Intellectual Property Office, the disclosure of which is incorporated by reference herein in its entirety.

BACKGROUND

1. Field

The disclosure relates to an electronic device for providing graphic data based on a voice, and an operation method therefor.

2. Description of Related Art

As technology has developed, electronic devices (e.g., a mobile terminal, a smart phone, a wearable device, and the like) are capable of providing various functions. For example, an electronic device may provide various functions, such as a voice communication function, a data communication function, a short-range wireless communication function (e.g., Bluetooth, near field communication (NFC), or the like), a mobile communication function (e.g., $3^{rd}$ generation (3G), 4G, 5G, or the like), a music or video reproduction function, a photographing or video recording function, a navigation function, or the like.

Particularly, an electronic device provides various services using a voice recognition technology.

The above information is presented as background information only to assist with an understanding of the disclosure. No determination has been made, and no assertion is made, as to whether any of the above might be applicable as a prior art with regard to the disclosure.

SUMMARY

An electronic device provides a technology of recognizing and analyzing a voice from a video, converting the voice into text, and providing the text as subtitles of the video. However, the way of converting a voice into text and providing the same is not enough to satisfy user's various needs.

Aspects of the disclosure are to address at least the above-mentioned problems and/or disadvantages and to provide at least the advantages described below. Accordingly, an aspect of the disclosure is to provide a method in which an electronic device provides graphic data based on a voice, and an apparatus for providing the same.

The technical subjects pursued in the disclosure may not be limited to the above-mentioned technical subjects, and other technical subjects which are not mentioned may be clearly understood, through the following descriptions, by those skilled in the art of the disclosure.

Additional aspects will be set forth in part in the description which follows and, in part, will be apparent from the description, or may be learned by practice of the presented embodiments.

In accordance with an aspect of the disclosure, an electronic device is provided. The electronic device includes a display, and a processor, and the processor is configured to, obtain at least one keyword from a voice signal related to a plurality of images, determine at least one graphic data corresponding to the at least one keyword, select at least one of the plurality of images, based on the point in time at which a voice corresponding to a keyword that corresponds to the determined graphic data is output, and perform control so as to apply the determined graphic data to the at least one selected image.

In accordance with an aspect of the disclosure, an operation method of an electronic device is provided. The operation method includes obtaining at least one keyword from a voice signal related to a plurality of images, determining at least one graphic data corresponding to the at least one keyword, selecting at least one image among the plurality of images, based on the point in time at which a voice corresponding to a keyword that corresponds to the determined graphic data is output, and performing control so as to apply the determined graphic data to the at least one selected image.

According to various embodiments, an electronic device may recommend and apply at least one graphic data based on a voice from a video content, so as to resolve user's inconveniences of manually searching for and selecting graphic data to be applied to the video content, and to provide graphic data that matches well with the voice from the video content. According to various embodiments, an electronic device automatically determines a point in time at which graphic data is to be applied, so as to resolve user's inconveniences of manually setting a point in time at which graphic data is to be applied.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
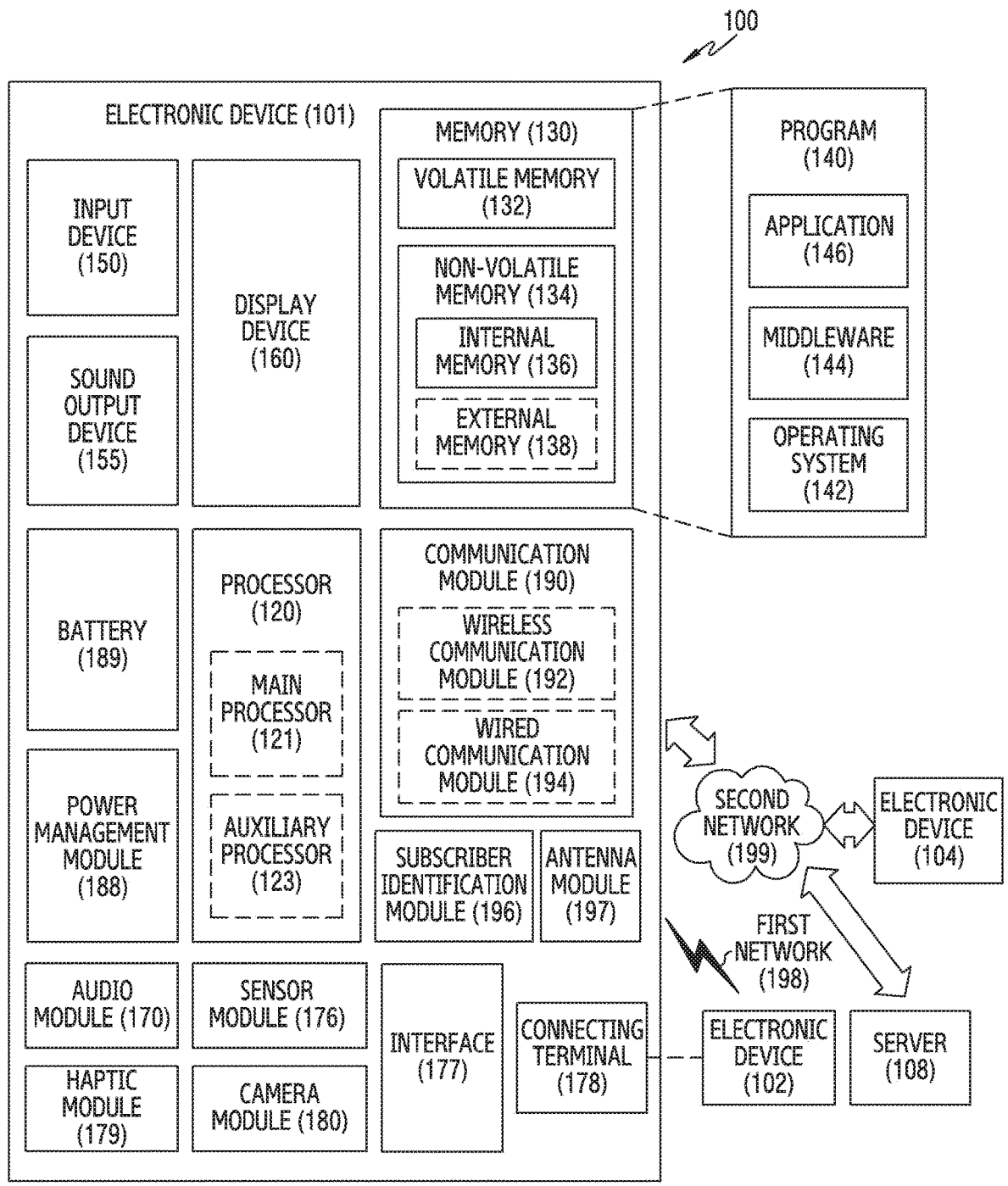
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, a processor 120 may obtain at least one keyword for providing graphic data from a voice signal of a video content. The video content may be a content including a plurality of images and a voice signal. For example, the video content may include at least one of a video that has been recorded by a camera, a video stored in an electronic device, a video that is being broadcasted in real time, or a video generated when a video call is performed by an electronic device. According to an embodiment, if an event for applying graphic data to a video content is incurred, the processor 120 may convert a voice signal of the video content into text and may obtain at least one keyword from the text obtained by conversion. The event for applying graphic data to the video content may include at least one of an event of requesting editing of a recorded video, an event of starting real-time video broadcasting, an event of starting a video call, an event of selecting a menu for requesting recommendation of a graphic effect associated with a video that is broadcasted in real time, or an event of selecting a menu for requesting recommendation of a graphic effect associated with an on-going video call. The voice signal may be a voice signal which has been recorded together with a video content or a voice signal that is input via a microphone in real time. The processor 120 may convert a voice signal into text characters using a voice recognition technology, such as speech to text (STT). The processor 120 may extract at least one meaningful word from the text obtained by conversion, and may determine the at least one extracted word as at least one keyword. For example, the processor 120 may determine a noun, and/or a pronoun included in the text as at least one keyword. According to an embodiment, the processor 120 may analyze an obtained voice and/or text so as to recognize context, and may determine at least one keyword based on the recognized context. For example, if a demonstrative pronoun is included in the obtained text, the processor 120 may recognize the meaning of the demonstrative pronoun based on the context, and may determine the recognized meaning as a keyword. According to an embodiment, the processor 120 may determine a plurality of words which are related to each other, as a single keyword. For example, "7 PM", which are two words, are related to each other, and the processor 120 may determine the words as a single keyword.

According to various embodiments, the processor 120 may determine graphic data corresponding to at least one keyword obtained from a voice signal. The graphic data may be one of the various types of contents which may be expressed visually. For example, the graphic data may include at least one from among, at least one image, picture, video, icon, emoticon, picture, map, webpage, shopping content, and graphic effect (e.g., a designated-object moving effect, a screen brightness change effect, a screen color change effect, or the like). The above-mentioned graphic data are merely examples provided to help understanding, and various embodiments are not limited thereto. The processor 120 may search for at least one graphic data corresponding to at least one keyword, and may determine the at least one retrieved graphic data as recommended graphic data. For example, if a plurality of keywords is obtained from a voice signal, the processor 120 may search for a plurality of graphic data respectively corresponding to the plurality of keywords, and may determine the plurality of retrieved graphic data as recommended graphic data. As another example, if a single keyword is obtained from a voice signal, the processor 120 may search for a plurality of graphic data corresponding to the single keyword, and may determine the plurality of retrieved graphic data as recommended graphic data. According to an embodiment, the processor 120 may search for graphic data corresponding to keyword, by using a graphic data DB stored in advance in the memory 130, and/or an external device (e.g., the electronic device 102, the electronic device 104, or the server 108). According to an embodiment, the processor 120 may provide a first user interface for selecting graphic data to be applied to at least an image among recommended graphic data. For example, the processor 120 may display at least one recommended graphic data corresponding to a voice on a display of the electronic device 101 using the display device 160, and may request a user to select graphic data to be applied to an image among the at least one recommended graphic data. The processor 120 may select a piece of recommended graphic data from the at least one recommended graphic data, based on a user input, and may determine the selected recommended graphic data as graphic data to be applied to an image. The user input may include, for example, at least one of a touch input, a drag input, a user gesture, or a voice command. For example, the processor 120 may determine graphic data to be applied to an image, based on at least one of a touch input to graphic data displayed on a display, a drag input that moves graphic data displayed on a first area of the display to a second area in which an image is displayed, a designated gesture, or a designated voice command According to an embodiment, if a user input for selecting graphic data is not detected within a designated time, the processor 120 may automatically determine graphic data to be applied to an image. For example, if a user input is not detected within a predetermined period of time from the point in time at which at least one recommended graphic data is displayed, the processor 120 may automatically determine graphic data to be applied to an image among at least one recommended graphic data, based on at least one of a user's preference, the priority of a keyword, or the priority of graphic data. According to an embodiment, the user's preference may be determined based on records of user selections made previously (in the past) in association with recommended graphic data. According to an embodiment, the priority of a keyword, and/or priority of graphic data may be determined and/or changed by an operator and/or a user. According to an embodiment, the priority of a keyword, and/or priority of graphic data may be determined and/or changed by applying a user's preference and/or preference of other users. According to an embodiment, if an automatic combination function associated with graphic data is activated, the operation of providing the first user interface may be omitted. The processor 120 may automatically select one of the at least one recommended graphic data, and may determine the selected recommended graphic data as graphic data to be applied to an image. If the automatic combination function is activated, the processor 120 may automatically select at least one recommended graphic data based on at least one of a user's preference, the priority of a keyword, the priority of graphic data, or context, and may combine the selected graphic data with a corresponding image. The automatic combination function may be activated or deactivated by a user input. For example, the processor 120 may provide a second user interface which includes a separate menu for controlling activation of the automatic combination function associated with graphic data. According to an embodiment, if the automatic combination function associated with graphic data is deactivated, the processor 120 may provide the first user interface that requests selection of recommended graphic data, as described above.

According to various embodiments, the processor 120 may select at least one image to which graphic data is to be applied, among a plurality of images included in a video content, based on the point in time at which a voice corresponding to a keyword is output. According to an embodiment, the processor 120 may identify a keyword corresponding to the determined graphic data, and may select at least one image corresponding to the point in time at which a voice corresponding to the identified keyword is output. For example, if a keyword corresponding to the determined graphic data is "7 PM", the processor 120 may select at least one image obtained while a voice corresponding to "7 PM" is output. According to an embodiment, the processor 120 may identify a phrase, a syntactic word, or a sentence including a keyword corresponding to the determined graphic data, and may select at least one image corresponding to the point in time at which a voice corresponding to the identified phrase, syntactic word, or sentence is output. For example, if a keyword corresponding to the determined graphic data is "7 PM", the processor 120 may select at least one image obtained while a voice corresponding to a sentence including "7 PM" (e.g., a sentence such as "A party will be held in Park Avenue at 7 PM today") is output.

According to various embodiments, the processor 120 may apply the determined graphic data to at least one selected image. According to an embodiment, the processor 120 may determine a first area, to which graphic data is to be applied, in the entire area of an image, based on a designated condition, and may apply the graphic data to a first area of each of the at least one image. The designated condition may include, for example, at least one of a condition of determining a first area among areas excluding an area where a face is displayed, a condition of determining a first area among areas around the face of a speaker, a condition of determining a first area within an area predetermined by a user, or a condition of determining a first area within a user's preferred area. The user's preferred area may be determined based on records of user's editing associated with graphic data. For example, the user's preferred area may be determined based on areas to which other graphic data are moved based on a user input provided before the present point. The above-described designated conditions are merely examples provided to help understanding of the disclosure, and various embodiments are not limited thereto. According to an embodiment, the processor 120 may determine whether a plurality of users are included in at least one selected image. If a plurality of users are included, the processor 120 may identify a user who outputs a voice corresponding to a keyword that corresponds to the determined graphic data, among the plurality of users. The processor 120 may determine a first area to which graphic data is to be applied, based on the location of the identified user and a designated condition, and may apply graphic data to a first area of each of at least one image. According to an embodiment, the first area to which graphic data is to be applied may be determined to be the same for all of the selected images, or may be determined to be different from each other. For example, the processor 120 may determine area A of a first image, area A of a second image, and area A of a third image, which are selected, as a first area to which graphic data is to be applied. As another example, the processor 120 may determine area A of the first image, area B of the second image, area C of the third image, which are selected, as a first area to which graphic data is to be applied. At least a part of the area B and the area C may not overlap area A, and at least a part of the area C may not overlap area B. According to an embodiment, the processor 120 may change an area to which graphic data is to be applied, based on a user input. For example, if a user's drag input to the graphic data applied to the first area is detected, the processor 120 may move the graphic data according to the drag input.

According to various embodiments, the processor 120 may store at least one image to which graphic data is applied, or may transmit the same to an external device (e.g., the electronic device 102, the electronic device 104, and the server 108). For example, when editing a recorded video content, the processor 120 may store at least one image to which graphic data is applied as at least a part of the video content. As another example, during real-time broadcasting, the processor 120 may transmit at least one image, to which graphic data is applied, together with a voice signal of a corresponding point in time, to an external device in real time.

According to various embodiments, the processor 120 may add an indicator related to graphic data to a point corresponding to at least one selected image on a timeline of a video content, and may perform control so as to display the added indicator. According to an embodiment, an indicator may indicate the graphic data type of graphic data that is applied to at least one image of a corresponding point in time. For example, if graphic data applied to images from an nth image to an (n+m)th image in a video content is map data indicating a predetermined place, the processor 120 may add a map-shaped icon to a location in the timeline, which corresponds to a reproduction point of the images from the nth image to the (n+m)th image, as an indicator. As another example, if graphic data applied to images from an nth image to an (n+m)th image in a video content is a graphic effect related to slang, the processor 120 may add a slang-related icon to a location in the timeline, which corresponds to a reproduction point of the images from the nth image to the (n+m)th image, as an indicator. According to embodiments, an indicator may be added at a point in time at which graphic data is applied, or a point in time at which a timeline is generated. For example, in the case of editing a recorded video, since a timeline associated with the video content may exist, the processor 120 may add an indicator related to graphic data to a corresponding point on the timeline at every point at which graphic data is applied. As another example, in the case of real-time broadcasting or real-time video call, a timeline is generated at a point in time at which broadcasting or a video call is ended. Accordingly, the processor 120 may add at least one indicator associated with at least one graphic data to a timeline, at a point in time at which the broadcasting or video call is ended. According to an embodiment, based on a user input that adjusts the location of an indicator added to a timeline, the processor 120 may perform control so as to apply graphic data related to the corresponding indicator to at least one other image. For example, if a user input (e.g., a drag input) that requests changing the location of a first indictor, which is added to a first point on a timeline, from the location of the first point to the location of a second point is detected, the processor 120 may delete graphic data related to the first indicator from at least one image corresponding to the first point and may apply and/or combine the graphic data related to the first indicator to/with at least one image corresponding to the second point.

According to various embodiments, the processor 120 may store at least one image to which graphic data is applied, or may transmit the same to an external device (e.g., the electronic device 102, the electronic device 104, and the server 108). For example, when editing a recorded video content, the processor 120 may store at least one image to which graphic data is applied as at least a part of the video content. As another example, during real-time broadcasting, the processor 120 may transmit at least one image, to which graphic data is applied, together with a voice signal of a corresponding point in time, to an external device in real time.

According to various embodiments, if an obtained keyword is a designated keyword or a keyword corresponding to a designated class, the processor 120 may provide a sound effect. The designated keyword and/or designated class may be set and changed by a designer and/or a user. For example, if an obtained keyword corresponds to slang, the processor 120 may perform control so as to provide a sound effect related to slang at the point in time at which a voice corresponding to the keyword is output. As another example, if an obtained keyword corresponds to a keyword designated by a user, the processor 120 may perform control so as to provide a sound effect related to the designated keyword at the point in time at which a voice corresponding to the keyword is output. For example, while editing a video, the processor 120 may perform control so that a sound effect is recorded and stored in a section in which a voice corresponding to a corresponding keyword is recorded. As another example, in the case of real-time broadcasting or a video call, the processor 120 may perform control so that a corresponding sound effect is transmitted together at a point in time at which a voice corresponding to a corresponding keyword is transmitted to an external device.

According to various embodiments, if an event of reproducing a recorded video content is detected, the processor 120 may reproduce the video content, and may successively display a plurality of images on a display, together with a timeline of the video content. A timeline may include, for example, at least one of information associated with the entire running time of a video content, information indicating a current reproduction point, or an indicator indicating a point at which graphic data is applied. According to an embodiment, if a user input to a predetermined point on a timeline, on which a first indicator is displayed, is detected while the video content is reproduced, the processor 120 may change a reproduction point of the video content to the predetermined point at which the user input is detected, so as to output images, to which a graphic effect corresponding to the first indicator is applied, and/or a corresponding sound effect. According to an embodiment, if the user input to the first indicator displayed on the timeline is detected while the video content is reproduced, the processor 120 may display graphic data related to the first indicator. For example, if the user input to the first indicator displayed on the timeline is detected while the video content is reproduced, the processor 120 may continue to reproduce the video content without changing a reproduction point of the video content, and may display graphic data related to the first indicator on at least a part of a display. The graphic data related to the first indicator may be displayed in a designated area (e.g., a chat data display area, an area around a speaker, an area close to a timeline, or an area close to the first indicator).

In the above-description, at least some operations may be performed by an external device (e.g., the electronic device 102, the electronic device 104, or the server 108). For example, in the above-description, it is illustrated that the processor 120 of the electronic device 101 obtains a keyword from a voice from a video content, and searches for graphic data corresponding to the keyword. However, at least one of the operation of obtaining a keyword and the operation of searching for graphic data may be performed by the server 108. For example, the processor 120 may transmit a voice signal of a video content to the server 108, may receive at least one keyword associated with the voice signal from the server 108, and may search for at least one graphic data corresponding to the received keyword. As another example, the processor 120 may transmit a voice signal of a video content to the server 108, and may receive at least one graphic data corresponding to a keyword of the voice signal from the server 108.

According to various embodiments, an electronic device 101 may include a display (e.g., the display device 160 of FIG. 1) and a processor (e.g., the processor 120 of FIG. 1), and the processor 120 may obtain at least one keyword from a voice signal related to a plurality of images, may determine at least one graphic data corresponding to the at least one keyword, may select at least one of the plurality of images, based on a point in time at which a voice corresponding to a keyword that corresponds to the determined graphic data is output, and may perform control so as to apply the determined graphic data to the at least one selected image.

According to various embodiments, the processor 120 may perform control so as to add, to a video content including the plurality of images, an indicator indicating a reproduction point of the at least one image to which the graphic data is applied.

According to various embodiments, the indicator may be displayed on a timeline of the video content.

According to various embodiments, the processor 120 may add the indicator to the timeline, at a point in time at which the graphic data is applied to the at least one selected image, or at a point in time at which the video content associated with the plurality of images is stored.

According to various embodiments, the processor 120 may change a reproduction point indicated by the indicator on the timeline from a first point to a second point, based on the drag input, if a drag input to an indicator displayed on the timeline is detected, may delete graphic data associated with the indicator from at least one image corresponding to the first point, and may apply the graphic data associated with the indicator to at least one other image corresponding to the second point.

According to various embodiments, the processor 120 may determine at least one recommended graphic data corresponding to the at least one keyword, may provide a user interface including the at least one determined recommended graphic data, and may determine graphic data to be applied to the at least one selected image among the at least one recommended graphic data, based on an input.

According to various embodiments, the input may include at least one of a touch input, a gesture input, or a voice input.

According to various embodiments, the processor 120 may determine whether the input is detected within a threshold time from a point in time at which the user interface is provided, and if the input is not detected within the threshold time, may automatically determine graphic data to be applied to the at least one selected image among the at least one recommended graphic data, based on at least one of a user's preference, the priority of the at least one keyword, the priority of the at least one recommended graphic data, or context based on the voice signal.

According to various embodiments, the processor 120 may determine whether the at least one keyword corresponds to a designated class, may determine a sound effect corresponding to the at least one keyword, if the at least one keyword corresponds to the designated class, and may perform control so as to apply the sound effect at a point in time at which a voice signal corresponding to the at least one keyword is output.

According to various embodiments, the processor 120 may determine whether a plurality of users are included in the at least one selected image, may identify a user who outputs a voice corresponding to a keyword that corresponds to the determined graphic data, among the plurality of users, if the plurality of users are included, may determine an application area to which the determined graphic data is to be applied, based at least on an area where the identified user is located in the at least one selected image, and may apply determined graphic data to the application area of the at least one selected image.

According to various embodiments, the processor 120 may change the application area for the graphic data in an area of the at least one selected image, based on a drag input to the applied graphic data.

According to various embodiments, the electronic device may further include a memory (e.g., the memory 130 of FIG. 1), and the processor 120 may obtain a video content from the memory 130, and may obtain a voice signal related to the plurality of images from the obtained video content.

According to various embodiments, the electronic device may further include a camera (e.g., the camera module 180 of FIG. 1), and an input device (e.g., the input device 150 of FIG. 1), and the processor may obtain the plurality of images from the camera, and may obtain a voice signal related to the plurality of images from the input device.

Figure 2:
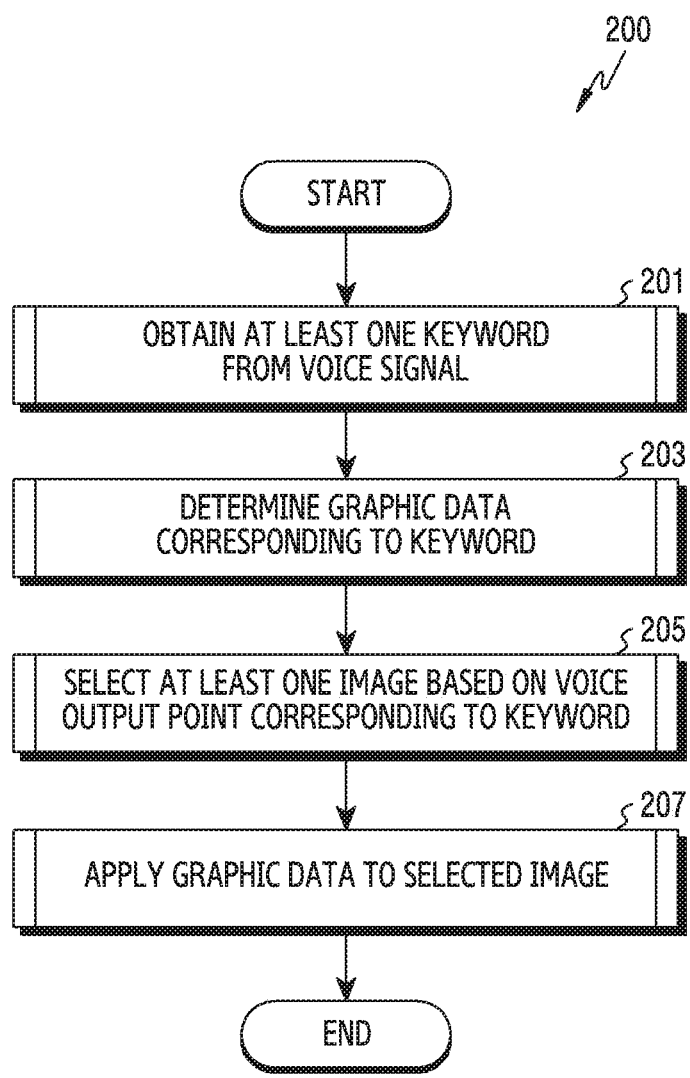
FIG. 2 is a flowchart illustrating a process of applying graphic data based on a voice signal of a video content, by an electronic device according to an embodiment of the disclosure.

FIG. 2 is a flowchart illustrating a process of applying graphic data based on a voice signal of a video content, by an electronic device according to an embodiment of the disclosure. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1.

Referring to FIG. 2, as illustrated in flowchart 200, an electronic device (e.g., the processor 120 of FIG. 1) according to various embodiments may obtain at least one keyword from a voice signal of a video content in operation 201. According to an embodiment, if an event of applying graphic data to a video content is incurred, the processor 120 may convert a voice signal of the video content into text and may obtain at least one keyword from the text obtained by conversion. The voice signal may be a voice signal recorded together with the video content or a voice signal that is input via a microphone in real time. According to an embodiment, the processor 120 may convert a voice signal into text characters using a voice recognition technology, such as speech to text (STT). The processor 120 may extract at least one word from the text obtained by conversion, and may obtain the at least one extracted word as at least one keyword. According to an embodiment, the processor 120 may obtain at least one keyword from the text obtained from conversion, based on the entire context. According to an embodiment, the processor 120 may obtain at least one keyword corresponding to a voice signal of a video content via communication with an external device (e.g., the electronic device 102, the electronic device 104, or the server 108). For example, the processor 120 may transmit a voice signal to the server 108, and may receive a signal including at least one keyword corresponding to the voice signal from the server 108.

According to various embodiments, the electronic device (e.g., the processor 120 of FIG. 1) may determine graphic data corresponding to the at least one keyword in operation 203. The graphic data may be one of the various types of contents which may be expressed visually. For example, the graphic data may include at least one from among, at least one image, picture, video, icon, emoticon, picture, map, webpage, shopping content, and graphic effect (e.g., a designated-object moving effect, a screen brightness change effect, a screen color change effect, or the like). The above-mentioned graphic data are merely examples provided to help understanding the disclosure, and various embodiments are not limited thereto. According to an embodiment, the processor 120 may search for at least one graphic data corresponding to (or related to) at least one keyword, and may determine the at least one retrieved graphic data as graphic data to be applied to an image. The processor 120 may search for graphic data corresponding to at least one keyword from a memory (e.g., the memory 130 of FIG. 1), or may transmit a signal for requesting graphic data corresponding to at least one keyword to an external device (e.g., the electronic device 102, the electronic device 104, or the server 108 of FIG. 1), and may obtain a signal including graphic data corresponding to the at least one keyword as a response to the request. According to an embodiment, if multiple pieces of graphic data correspond to at least one keyword, the processor 120 may determine graphic data to be applied to an image among the multiple graphic data, based on at least one of a user input, a user's preference, or a priority.

According to various embodiments, the electronic device (e.g., the processor 120 of FIG. 1) may select at least one image based on the point in time at which a voice corresponding to a keyword that corresponds to the determined graphic data is output, in operation 205. According to an embodiment, the processor 120 may identify a keyword corresponding to the determined graphic data, and may select at least one image corresponding to the point in time at which a voice corresponding to the identified keyword is output. For example, if the keyword corresponding to the determined graphic data is "today", the processor 120 may select at least one of a plurality of images obtained while a voice corresponding to "today" is output. According to an embodiment, the processor 120 may identify a phrase, a syntactic word, or a sentence including a keyword that corresponds to the determined graphic data, and may select at least one image corresponding to the point in time at which a voice corresponding to the identified phrase, syntactic word, or sentence is output. For example, if the keyword corresponding to the determined graphic data is "today", the processor 120 may select at least one of a plurality of images obtained while a voice corresponding to a sentence including "today" (e.g., a sentence such as "A party will be held in Park Avenue at 7 PM today") is output.

According to various embodiments, the electronic device (e.g., the processor 120 and/or the display device 160 of FIG. 1) may apply the determined graphic data to the at least one selected image in operation 207. According to an embodiment, the processor 120 may determine a first area to which graphic data is to be applied in the whole area of an image, based on a designated condition, and may apply the determined graphic data to the determined first area of each of at least one image. The designated condition may include, for example, at least one of a condition of determining a first area among areas excluding an area where a face is displayed, a condition of determining a first area among areas around the face of a speaker, a condition of determining a first area within an area predetermined by a user, or a condition of determining a first area within a user's preferred area. The user's preferred area may be determined based on records of user's editing associated with graphic data. For example, the user's preferred area may be determined based on areas to which other graphic data are moved based on a user input provided before the present point. The above-described designated conditions are merely examples provided to help understanding of the disclosure, and various embodiments are not limited thereto. According to an embodiment, the first area to which graphic data is to be applied may be determined to be the same for all of the selected images, or may be determined to be different from each other. For example, the processor 120 may determine area A of a first image, area A of a second image, area A of a third image, which are selected, as a first area to which graphic data is to be applied. As another example, the processor 120 may determine area A of the first image, area B of the second image, area C of the third image, which are selected, as a first area to which graphic data is to be applied. At least a part of the area B and the area C may not overlap area A, and at least a part of the area C may not overlap area B.

Figure 3:
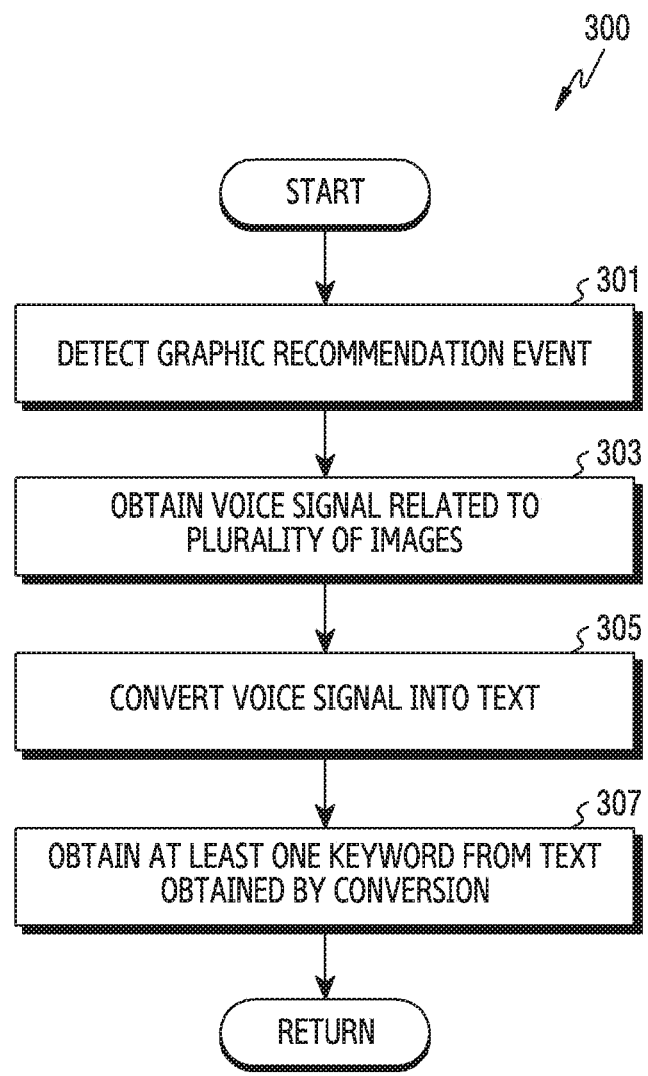
FIG. 3 is a flowchart illustrating a process of obtaining a keyword from a voice signal of a video content, by an electronic device according to an embodiment of the disclosure.

FIG. 3 is a flowchart illustrating a process of obtaining a keyword from a voice signal of a video content, by an electronic device according to an embodiment of the disclosure. Operations of FIG. 3 described hereinafter may be at least a part of the detailed operations of operation 201 of FIG. 2. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1.

Referring to FIG. 3, in reference to flowchart 300, an electronic device (e.g., the processor 120 of FIG. 1) according to various embodiments may detect a graphic recommendation event in operation 301. The graphic recommendation event may include an event for applying graphic data to a video content using a voice signal of the video content. According to an embodiment, if at least one of an event of requesting editing of a recorded video, an event of starting real-time video broadcasting, an event of starting a video call, an event of selecting a menu for requesting recommendation of a graphic effect associated with a video that is broadcasted in real time, or an event of selecting a menu for requesting recommendation of a graphic effect associated with an on-going video call is detected, the processor 120 may determine that a graphic recommendation event occurs.

According to various embodiments, the electronic device (e.g., the processor 120) may obtain a voice signal related to a plurality of images in operation 303. According to an embodiment, the processor 120 may obtain a voice signal related to a plurality of images included in a video content, from the video content stored in the memory (e.g., the memory 130 of FIG. 1). For example, if the event for requesting editing of a recorded video is detected, the processor 120 may obtain a video content of which editing is requested, from the memory 130, and may obtain a voice signal included in the obtained video content. According to an embodiment, the processor 120 may obtain a voice signal related to a plurality of images via a microphone (e.g., the input device 150 of FIG. 1) in real time. For example, if the event of starting real-time video broadcasting or the event of starting a video call is detected, the processor 120 may obtain a plurality of images from a camera (e.g., the camera module 180 of FIG. 1), and may obtain a voice signal related to the plurality of images via a microphone (e.g., the input device 150) in real time.

According to various embodiments, the electronic device (e.g., the processor 120) may convert the voice signal into text in operation 305. According to an embodiment, the processor 120 may convert the voice signal into text using a voice recognition technology. For example, the processor 120 may use a technology such as speech to text (STT).

According to various embodiments, the electronic device (e.g., the processor 120) may obtain at least one keyword from the text obtained by conversion, in operation 307. According to an embodiment, the processor 120 may extract at least one meaningful word from the text, and may determine the at least one extracted word as at least one keyword. For example, the processor 120 may extract a noun and/or a pronoun included in the text, and may determine the extracted noun and/or pronoun as at least one keyword. According to an embodiment, the processor 120 may analyze obtained voice and/or text so as to recognize context, and may determine at least one keyword based on the recognized context. For example, if a demonstrative pronoun is included in the obtained text, the processor 120 may recognize the meaning of the demonstrative pronoun based on the context, and may determine the recognized meaning as a keyword. For example, if a demonstrative pronoun "there" is included in the obtained text, the processor 120 may recognize the place indicated by "there" based on context, and may determine the recognized place as a keyword. According to an embodiment, the processor 120 may determine a plurality of words which are related to each other, as a single keyword. For example, "7 PM" are two words which have a temporal relationship and thus, the processor 120 may determine the words as a single keyword.

Figure 4:
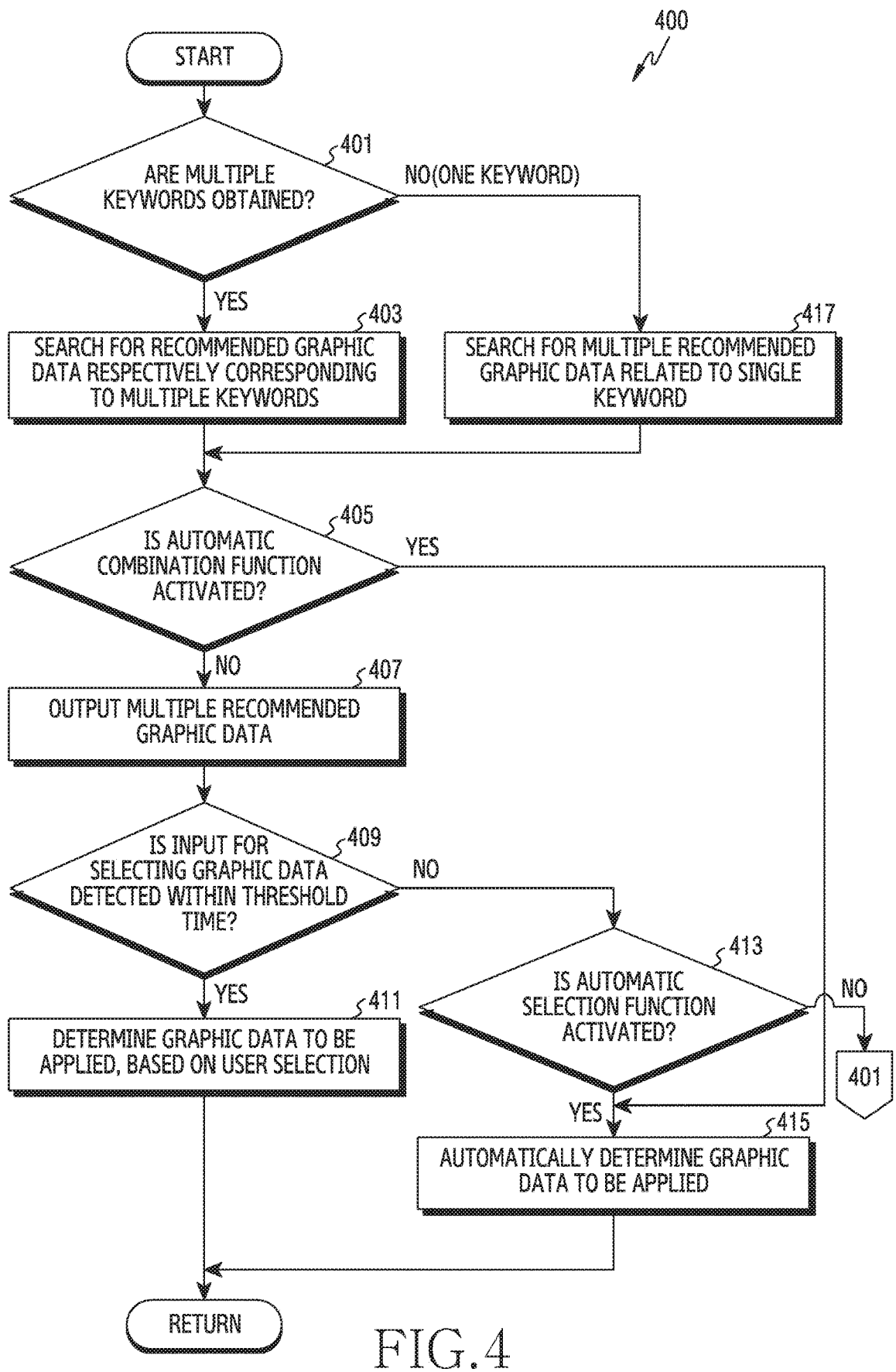
FIG. 4 is a flowchart illustrating a process of determining graphic data based on a keyword of a voice signal, by an electronic device according to an embodiment of the disclosure.

FIG. 4 is a flowchart illustrating a process of determining graphic data based on a keyword of a voice signal, by an electronic device according to an embodiment of the disclosure. Operations of FIG. 4 described hereinafter may be at least a part of the detailed operations of operation 203 of FIG. 2. In the embodiment provided hereinafter, operations may be performed sequentially, but it is not necessarily limited thereto. Referring to FIG. 4, as shown in flowchart 400, the order of operations may be changed, and at least two operations may be performed in parallel. Here, an electronic device may be the electronic device 101 of FIG. 1. Hereinafter, at least some operations of FIG. 4 will be described with reference to FIGS. 5A, 5B and 5C.

Figure 5A:
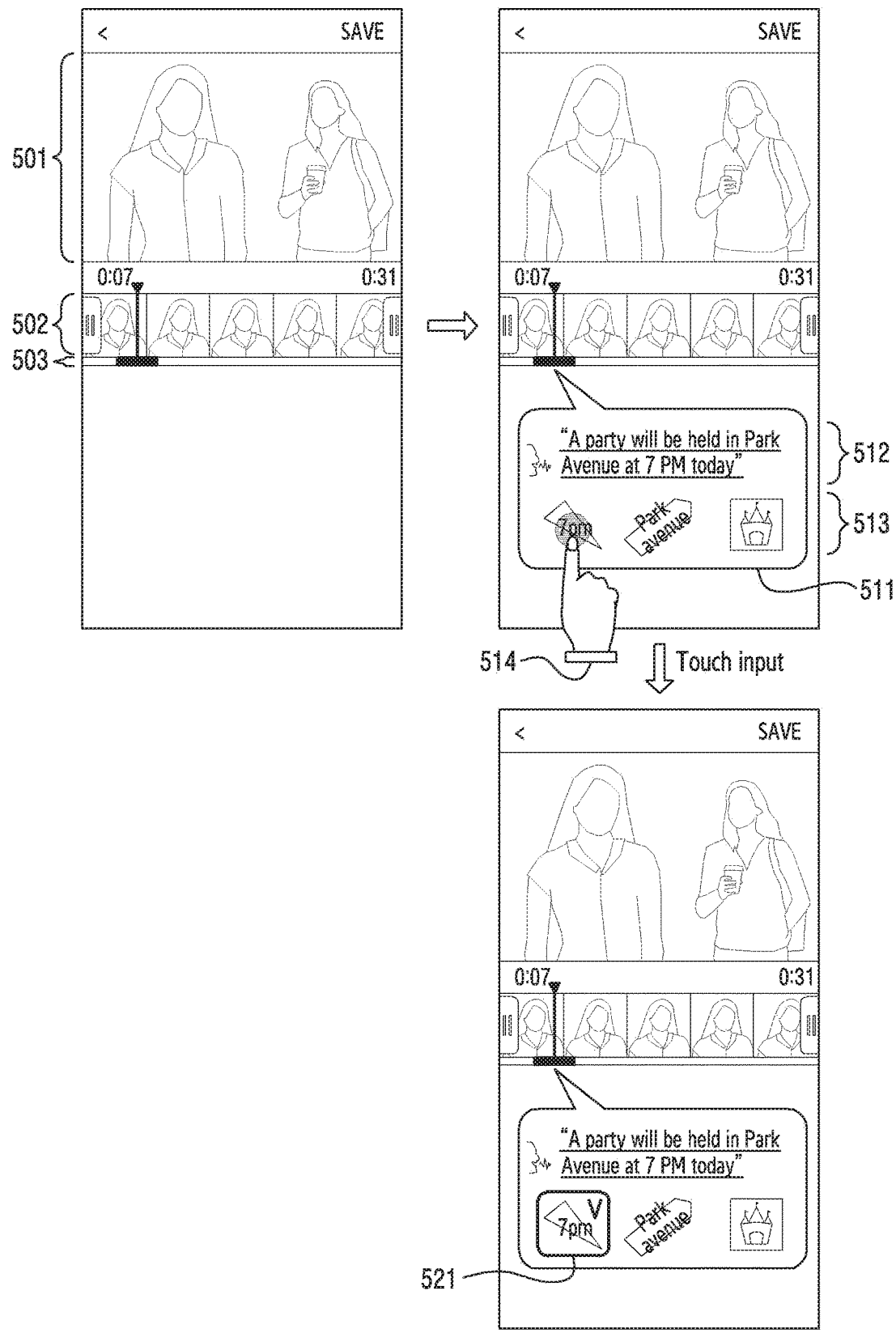
FIG. 5A is a diagram illustrating an example of a screen configuration of recommending and determining graphic data corresponding to a voice signal, by an electronic device according to an embodiment of the disclosure.

FIG. 5A is a diagram illustrating an example of a screen configuration of recommending and determining graphic data corresponding to a voice signal, by an electronic device according to an embodiment of the disclosure.

Figure 5B:
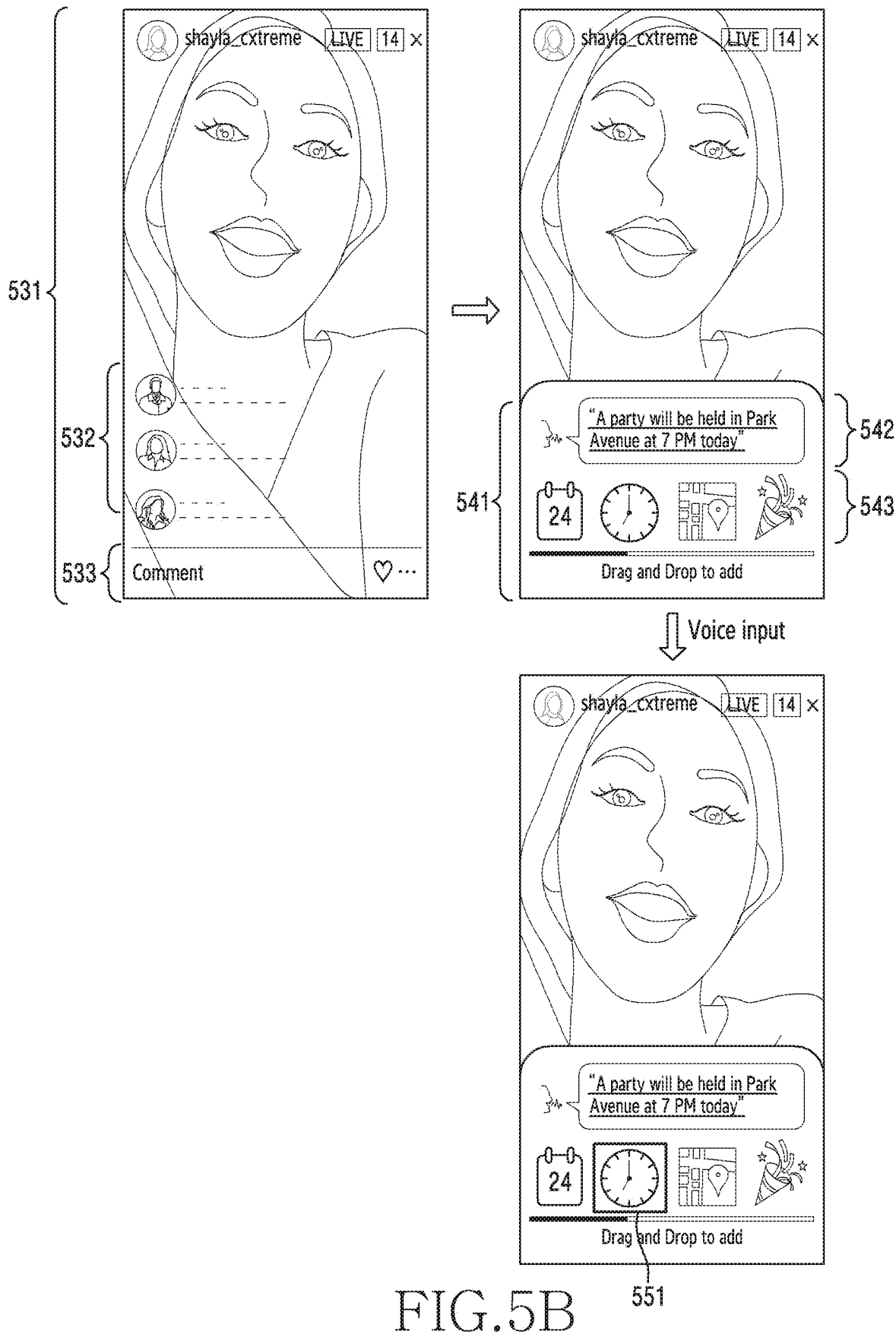
FIG. 5B is a diagram illustrating an example of a screen configuration of recommending and determining graphic data corresponding to a voice signal, by an electronic device according to an embodiment of the disclosure.

FIG. 5B is a diagram illustrating an example of a screen configuration of recommending and determining graphic data corresponding to a voice signal, by an electronic device according to an embodiment of the disclosure.

Figure 5C:
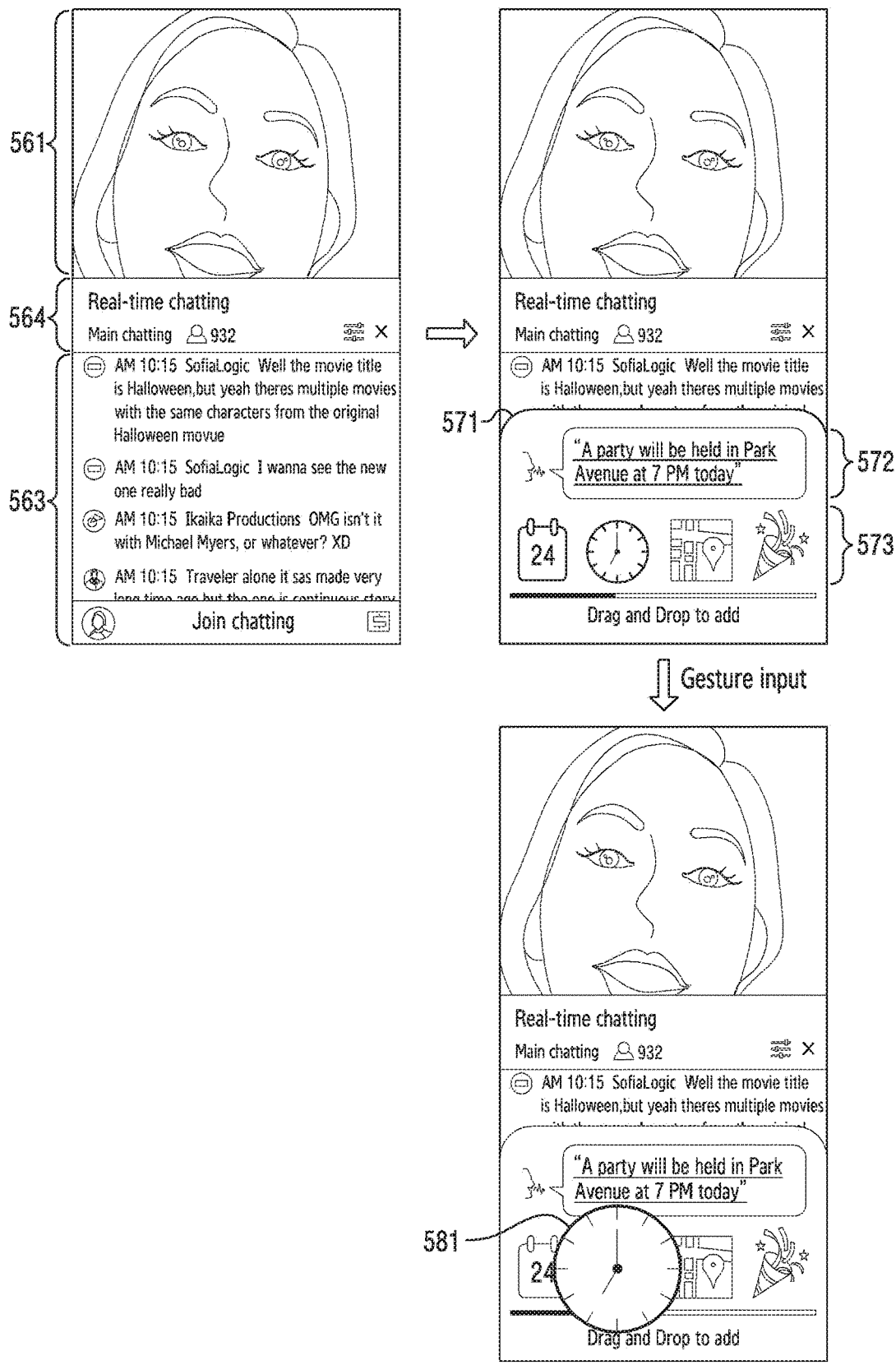
FIG. 5C is a diagram illustrating an example of a screen configuration of recommending and determining graphic data corresponding to a voice signal, by an electronic device according to an embodiment of the disclosure.

FIG. 5C is a diagram illustrating an example of a screen configuration of recommending and determining graphic data corresponding to a voice signal, by an electronic device according to an embodiment of the disclosure.

Referring to FIG. 4, an electronic device (e.g., the processor 120 of FIG. 1) according to various embodiments may determine whether a plurality of keywords is obtained in operation 401. According to an embodiment, the processor 120 may obtain at least one keyword as described in operation 201 and/or FIG. 3, and may determine whether a plurality of keywords or a single keyword is obtained. For example, the processor 120 may determine whether a plurality of keywords or a single keyword is obtained from a voice signal, which has a designated length and/or a designated condition. The designated length may indicate a designated period of time. The designated condition may be a condition associated with a phase, a syntactic word, and/or a sentence. For example, the processor 120 may determine whether a single keyword or a plurality of keywords is obtained from a voice signal including a single sentence. As another example, the processor 120 may determine whether a single keyword or a plurality of keywords is obtained from a voice signal having a length of n seconds. The above-mentioned examples of the designated length and/or designated condition are provided to help understanding embodiments, and the embodiments are not limited thereto.

According to various embodiments, if a plurality of keywords is obtained, the electronic device (e.g., the processor 120) may search for a plurality of pieces of recommended graphic data respectively corresponding to a plurality of keywords in operation 403. For example, if two keywords are obtained, the processor 120 may search for at least one first graphic data corresponding to a first keyword and may search for at least one second graphic data corresponding to a second keyword. The processor 120 may determine the first and second graphic data retrieved respectively for the two keywords as recommended graphic data.

According to various embodiments, if a plurality of keywords is not obtained (if only a single keyword is obtained), the electronic device (e.g., the processor 120) may search for a plurality of pieces of recommended graphic data corresponding to a single keyword in operation 417. According to an embodiment, the processor 120 may search for a plurality of pieces of graphic data corresponding to the obtained single keyword, and may determine the retrieved graphic data as recommended graphic data.

According to various embodiments, the electronic device (e.g., the processor 120) may determine whether an automatic combination function is activated in operation 405. The automatic combination function may be, for example, a function of automatically selecting one of recommended graphic data based on at least one of a user's preference, the priority of a keyword, the priority of graphic data, or context, without selection by a user, and combining the selected recommended graphic data with a corresponding image. The automatic combination function may be activated or deactivated by a user input. For example, the processor 120 may provide a second user interface which includes a setting menu associated with activation of the automatic combination function.

According to various embodiments, if the automatic combination function is not activated, the electronic device (e.g., the processor 120 and/or the display device 160 of FIG. 1) may output a plurality of pieces of recommended graphic data in operation 407. According to an embodiment, the processor 120 may provide a first user interface including retrieved recommended graphic data, and may request selection of graphic data to be applied to a corresponding image among the plurality of pieces of recommended graphic data. According to an embodiment, the first user interface may additionally include the script of a voice signal corresponding to recommended graphic data. The script of the voice signal may be generated based on text converted from the voice signal. For example, the processor 120 may display at least one recommended graphic data corresponding to the text of a voice signal or a keyword of the text on at least a part of the display of the electronic device 101, and may request a user to select graphic data to be applied to an image among the at least one recommended graphic data.

Referring to FIG. 5A, the processor 120 may control a display (e.g., the display device 160 of FIG. 1) so as to additionally display a first user interface 511 including a script 512 of a voice signal and recommended graphic data 513 on at least a part of the display in the state in which a video editing screen including a preview area 501, a timeline area 502, and a reproduction point display area 503 is displayed. The area where the first user interface 511 is displayed may be configured to not overlap the preview area 501, the timeline area 502, and the reproduction point display area 503. According to an embodiment, the preview area 501 may be an area that successively displays a plurality of images when a video content is reproduced and/or edited. The timeline area 502 may be an area that displays at least one image corresponding to a predetermined reproduction time interval (or predetermined reproduction section) of the video content. The reproduction point display area 503 may be an area that displays a time interval (or section) that is currently reproduced and/or edited among the entire time intervals of the video content. The first user interface 511 may be configured to indicate a time interval (or section) associated with the script 512 of the voice signal and the recommended graphic data 513 included in the first user interface 511. For example, the first user interface 511 may be configured in the form of a word bubble that is derived from an associated time interval.

Referring to FIGS. 5B and 5C, the processor 120 may control the display (e.g., the display device 160) to additionally display a first user interface 541 and 571 which includes a script 542 and 572 of a voice signal and recommended graphic data 543 and 573 on at least a part of the display in the state in which a real-time broadcasting screen is displayed, including a real-time broadcasting image display area 531 and 561, an area 532 and 562 displaying information associated with users who listening to broadcasting, and a chat information display area 533, 563, and 564. The area that displays the first user interface 541 and 571 may be configured so that at least a part thereof overlaps at least one of the real-time broadcasting image display area 531 and 561, the area 562 for displaying information associated with users who listen broadcasting, or the chat information display area 563.

According to various embodiments, the electronic device (e.g., the processor 120) may determine whether an input for selecting graphic data is detected within a threshold time in operation 409. The threshold time may be a predetermined period of time from the point in time at which recommended graphic data is output (or displayed). The threshold time may be set and/or changed by an operator and/or a user. The input for selecting graphic data may include at least one of a touch input, a drag input, a user gesture, or a voice command. For example, the input for selecting graphic data may include at least one of an input that touches one of the displayed recommended graphic data, a drag input that drags one of the displayed recommended graphic data and drops the same to an area where an image is displayed (e.g., the preview area 501, the real-time broadcasting image display area 531 and 561), a user gesture (e.g., a finger gesture) that indicates one of the graphics from a first graphic to an $n^{th}$ graphic, a voice command including what number graphic data is desired to be selected, or a voice command including the meaning of graphic data desired to be selected.

According to various embodiments, if an input for selecting graphic data is detected within a threshold time, the electronic device (e.g., the processor 120) may determine graphic data to be applied, based on the user selection in operation 411. According to an embodiment, the processor 120 may display recommended graphic data selected by a user input among the recommended graphic data, and may determine the selected recommended graphic data as graphic data to be combined with a corresponding image. For example, as illustrated in FIG. 5A, if a touch input 514 to first graphic data among the recommended graphic data included in the first user interface 511 is detected, it may be indicated that the first graphic data has been selected as shown in diagram 521. Referring to FIG. 5B, if a voice command (e.g., a second graphic or second sticker) for selecting second graphic data among the recommended graphic data included in the first user interface 541 is detected, it may be indicated that the second graphic data has been selected as shown in diagram 551. Referring to FIG. 5C, if a gesture (e.g., a gesture of spreading out two fingers) for selecting second graphic data among the recommended graphic data included in the first user interface 571 is detected, it may be indicated that the second graphic data has been selected as shown in diagram 581. According to an embodiment, the processor 120 may indicate that corresponding recommended graphic data has been selected, by changing the displayed size of the selected recommended graphic data. This is merely an example, and the processor 120 may indicate that corresponding recommended graphic data has been selected, by adjusting the color, the thickness, and sharpness of the selected recommended graphic data.

According to various embodiments, if an input for selecting graphic data is not detected within the threshold time, the electronic device (e.g., the processor 120) may determine whether the automatic selection function is activated in operation 413. The automatic selection function may be a function of automatically selecting one of the recommended graphic data based on at least one of a user's preference, the priority of a keyword, the priority of graphic data, or context, and combining the selected recommended graphic data with a corresponding image, if the user input is not detected within the threshold time. The automatic selection function may be activated or deactivated by a user input. For example, the processor 120 may provide a user interface which includes a setting menu associated with activation of the automatic selection function.

According to various embodiments, if the automatic selection function is activated or the automatic combination function is activated, the electronic device (e.g., the processor 120) may automatically determine graphic data to be combined with an image among the plurality of pieces of recommended graphic data in operation 415. According to an embodiment, the processor 120 may automatically select one of the recommended graphic data based on at least one of a user's preference, the priority of a keyword, the priority of graphic data, or context, and may determine the selected graphic data as graphic data to be applied. The user's preference may be determined and updated based on records of user selections made previously (in the past) in association with recommended graphic data. According to an embodiment, the priority of a keyword, and/or priority of graphic data may be determined and/or changed by an operator and/or a user. According to an embodiment, the priority of a keyword, and/or priority of graphic data may be determined and/or changed by applying a user's preference and/or preference of other users. For example, if it is identified that place-related graphic data is most frequently selected by a user to combine with an image up to the current, by analyzing a user's preference, the processor 120 may determine place-related graphic data among the recommended graphic data as graphic data to be applied. As another example, the processor 120 may identify the graphic data type of each recommended graphic data, and may determine recommended graphic data, which corresponds to a type having the highest user's preference, as graphic data to be applied. As another example, the processor 120 may determine a keyword related to a word that a user desires to emphasize, based on context, and may determine recommended graphic data corresponding to the determined keyword as graphic data to be applied.

According to various embodiments, if the automatic selection function is not activated, the electronic device (e.g., the processor 120 and/or the display device 160 of FIG. 1) may remove a plurality of pieces of recommended graphic data from the display and return to operation 401. For example, if a user input for selecting graphic data to be combined with an image among a plurality of pieces of recommended graphic data is not detected during a threshold time, and an automatic selection function is in a deactivated state, the processor 120 may determine that a user does not desire to combine the corresponding recommended graphic data with an image, and may return to operation 401 and perform subsequent operations again in order to recommend and/or determine graphic data corresponding to a subsequent voice signal.

Figure 6:
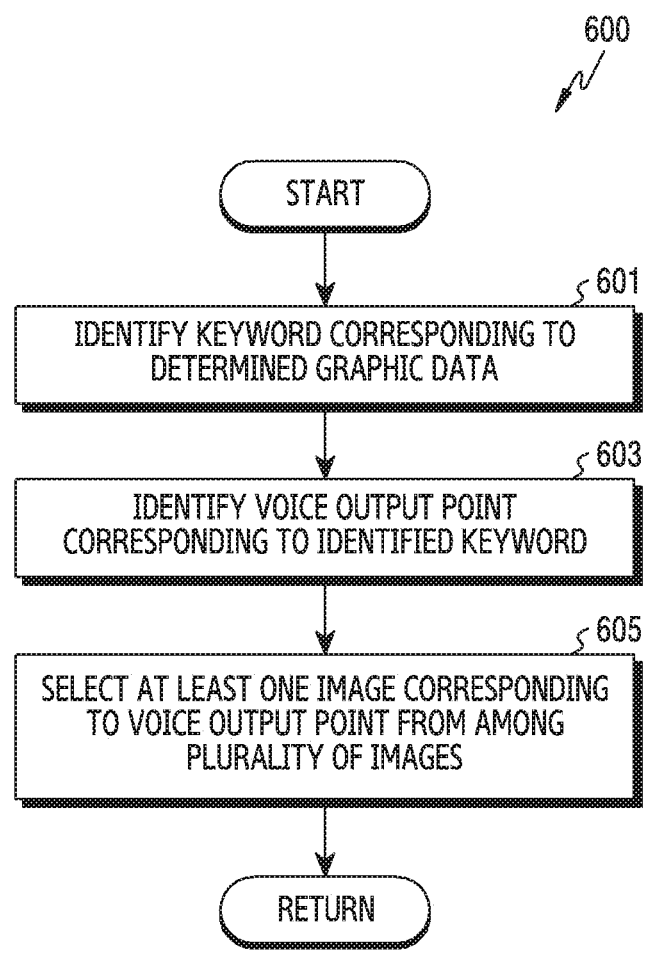
FIG. 6 is a flowchart illustrating a process of determining at least one image to which graphic data is to be applied, by an electronic device according to an embodiment of the disclosure.

FIG. 6 is a flowchart illustrating a process of determining at least one image to which graphic data is to be applied, by an electronic device according to an embodiment of the disclosure. Operations of FIG. 6 described hereinafter may be at least a part of the detailed operation of operation 205 of FIG. 2. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1.

Referring to FIG. 6 and flowchart 600, an electronic device (e.g., the processor 120 of FIG. 1) according to various embodiments may identify a keyword corresponding to determined graphic data in operation 601. According to an embodiment, the processor 120 may identify a keyword corresponding to the determined graphic data as illustrated in operation 203 of FIG. 2 and/or FIG. 4.

According to various embodiments, the electronic device (e.g., the processor 120) may identify the point in time at which a voice corresponding to the identified keyword is output in operation 603. According to an embodiment, while editing a video content, the processor 120 may identify a reproduction time interval of the video content, which corresponds to a time interval in which the voice corresponding to the identified keyword is output. According to an embodiment, in the case of real-time broadcasting, the processor 120 may identify the point in time (or a time interval) at which a voice corresponding to the identified keyword is output and is input via a microphone (e.g., the input device 150 of FIG. 1).

According to various embodiments, the electronic device (e.g., the processor 120) may select at least one image corresponding to the point in time at which the voice is output among a plurality of images in operation 605. The plurality of images may be a plurality of images included in a recorded video content, or a plurality of images included in a video content that is broadcasted in real time. According to an embodiment, the processor 120 may select at least one image to which graphic data is to be applied, among the plurality of images included in a video content, based on the point in time at which the voice corresponding to the keyword that corresponds to the determined graphic is output. For example, if it is identified that a keyword corresponding to determined graphic data is "7 PM" and the point in time at which a voice output point for the "7 PM" is 00:00:07-00:00:09, while a video content is edited, the processor 120 may select at least one image among a plurality of images corresponding to the section of 00:00:07-00:00:09 of the video content. As another example, if it is identified that a keyword corresponding to determined graphic data is "today" and a voice output point for the "today" is 01:00:06-01:00:07, during real-time broadcasting, the processor 120 may select at least one image among a plurality of images obtained via a camera (e.g., the camera module 180 of FIG. 1) during 01:00:06-01:00:07. According to an embodiment, the processor 120 may identify a phrase, a syntactic word, or a sentence including a keyword corresponding to the determined graphic data, and may select at least one image corresponding to the point in time at which a voice corresponding to the identified phrase, syntactic word, or sentence is output. For example, if the keyword corresponding to the determined graphic data is "7 PM", the processor 120 may select at least one image among a plurality of images corresponding to the voice output point for a sentence including "7 PM" (e.g., a sentence such as "A party will be held in Park Avenue at 7 PM today").

Figure 7:
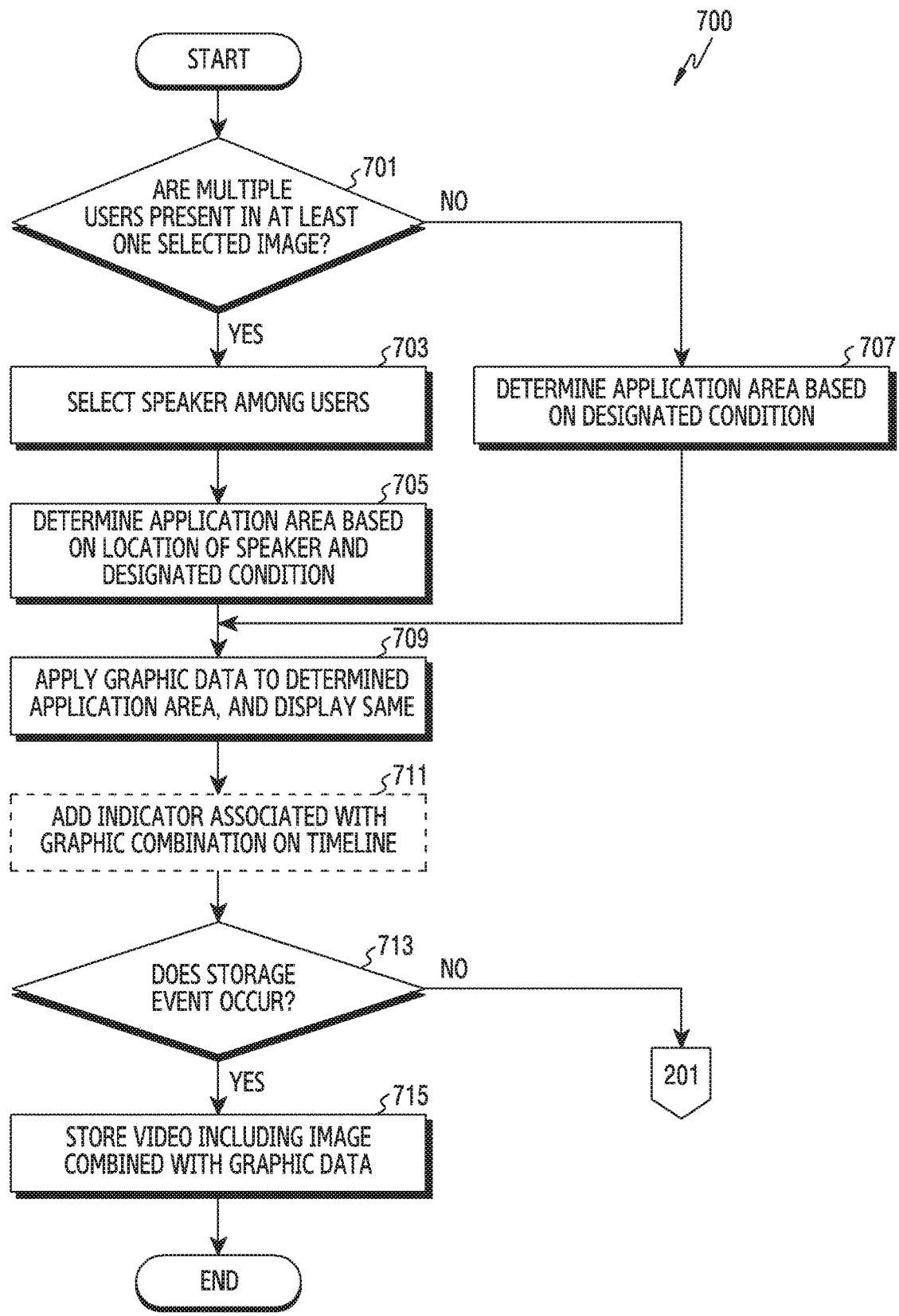
FIG. 7 is a flowchart illustrating a process of applying graphic data to a video content, by an electronic device according to an embodiment of the disclosure.

FIG. 7 is a flowchart illustrating a process of applying graphic data to a video content, by an electronic device according to an embodiment of the disclosure. Operations of FIG. 7 described hereinafter may be at least a part of the detailed operations of operation 207 of FIG. 2. In the embodiment provided hereinafter, operations may be performed sequentially, but it is not necessarily limited thereto. For example, the order of operations may be changed, and at least two operations may be performed in parallel. Hereinafter, an operation marked by a broken line may be omitted depending on the embodiment. Here, an electronic device may be the electronic device 101 of FIG. 1. Hereinafter, at least some operations of FIG. 6 will be described with reference to FIGS. 8A to 8E.

Figure 8A:
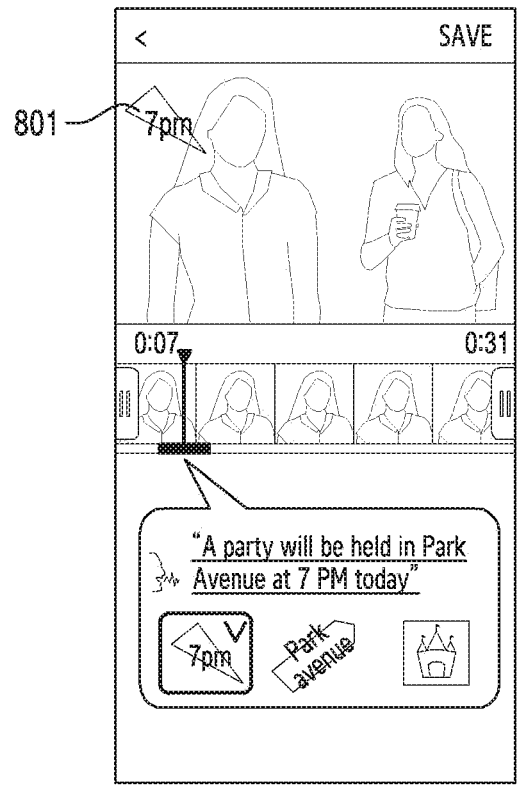
FIG. 8A is a diagram illustrating an example of a screen configuration of applying graphic data, by an electronic device according to an embodiment of the disclosure.

FIG. 8A is a diagram illustrating an example of a screen configuration of applying graphic data, by an electronic device according to an embodiment of the disclosure.

Figure 8B:
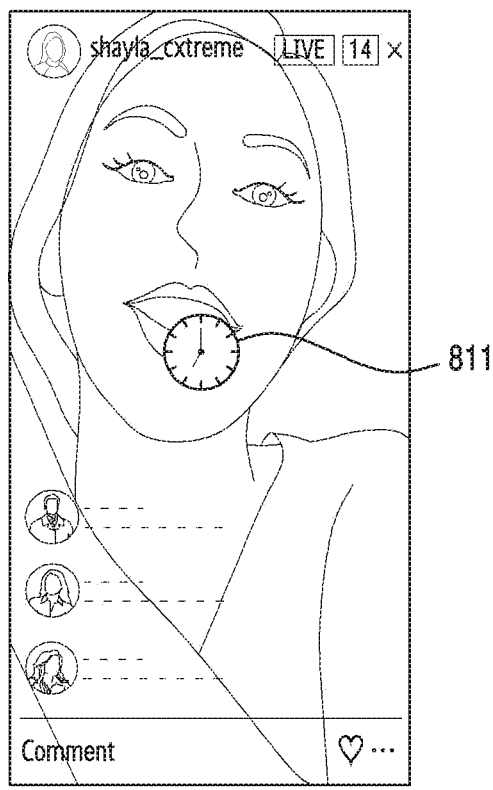
FIG. 8B is a diagram illustrating an example of a screen configuration of applying graphic data, by an electronic device according to an embodiment of the disclosure.

FIG. 8B is a diagram illustrating an example of a screen configuration of applying graphic data, by an electronic device according to an embodiment of the disclosure.

Figure 8C:
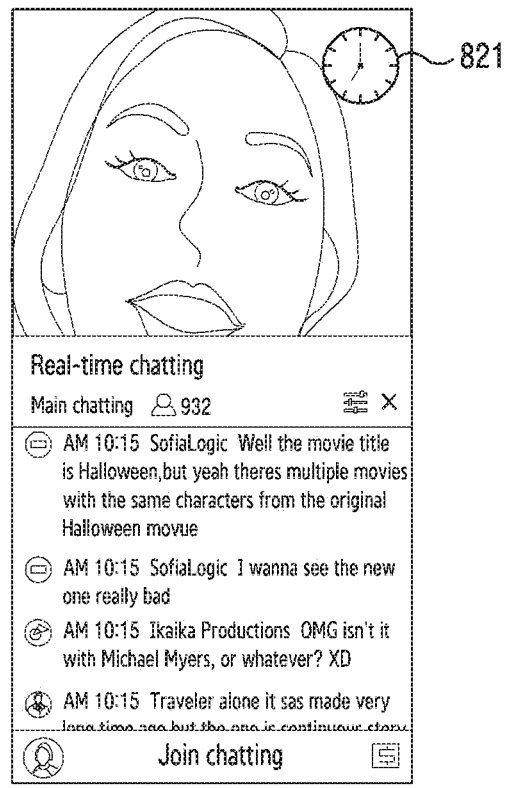
FIG. 8C is a diagram illustrating an example of a screen configuration of applying graphic data, by an electronic device according to an embodiment of the disclosure.

FIG. 8C is a diagram illustrating an example of a screen configuration of applying graphic data, by an electronic device according to an embodiment of the disclosure.

Figure 8D:
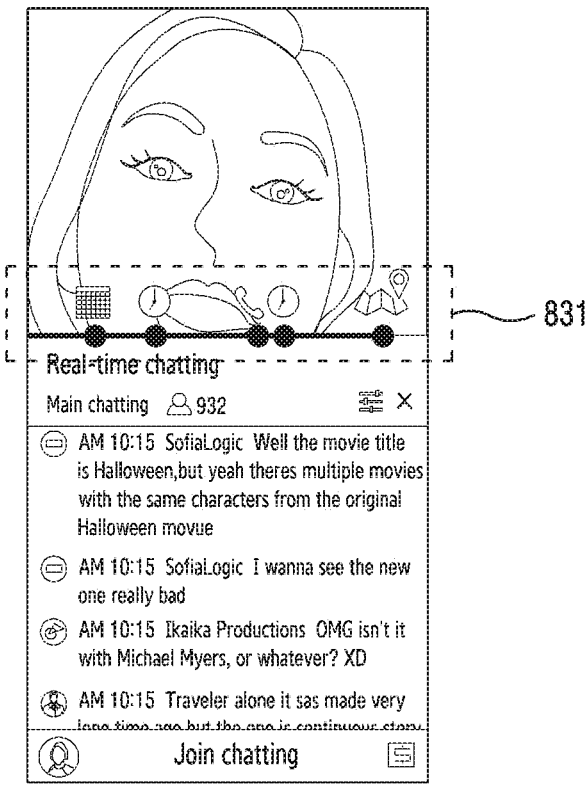
FIG. 8D is a diagram illustrating an example of a screen configuration of displaying an indicator indicating that graphic data is applied, on a timeline of a video content, by an electronic device according to an embodiment of the disclosure.

FIG. 8D is a diagram illustrating an example of a screen configuration of displaying an indicator indicating that graphic data is applied, on a timeline of a video content, by an electronic device according to an embodiment of the disclosure.

Figure 8E:
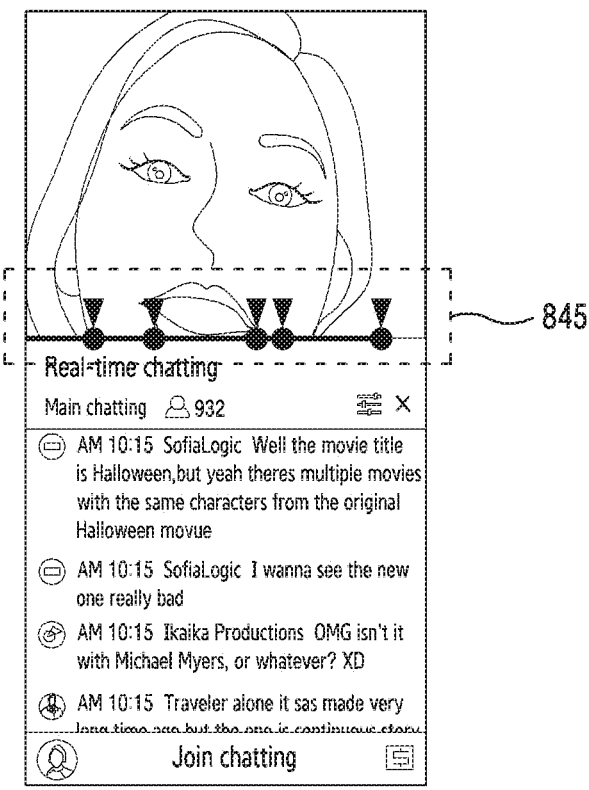
FIG. 8E is a diagram illustrating an example of a screen configuration of displaying an indicator indicating that graphic data is applied, on a timeline of a video content, by an electronic device according to an embodiment of the disclosure.

FIG. 8E is a diagram illustrating an example of a screen configuration of displaying an indicator indicating that graphic data is applied, on a timeline of a video content, by an electronic device according to an embodiment of the disclosure.

Referring to FIG. 7 and flowchart 700, an electronic device (e.g., the processor 120 of FIG. 1) according to various embodiments may determine whether a plurality of users are present in at least one selected image in operation 701. For example, the processor 120 may determine whether a plurality of users are present in the at least one image selected in operation 205 of FIG. 2 and/or FIG. 6.

According to various embodiments, if a plurality of users are present in the at least one image, the electronic device (e.g., the processor 120) may select a speaker among the users in operation 703. According to an embodiment, the processor 120 may analyze movement of the users in the image, may identify a user who outputs a voice corresponding to a keyword that corresponds to determined graphic data among the plurality of users, and may select the identified user as a speaker.

According to various embodiments, the electronic device (e.g., the processor 120) may determine an application area based on the location of the speaker and a designated condition in operation 705. According to an embodiment, the processor 120 may determine an application area (or a first area) to which graphic data is to be applied in the entire area of the image, based on the location of the speaker and the designated condition. The location of the speaker may include, for example, an area where the identified speaker is present in the area of the image. The designated condition may include, for example, at least one of a condition of determining an application area among areas excluding an area where a face is displayed, a condition of determining an application area among areas around the face of a speaker, a condition of determining an application area within an area predetermined by a user, or a condition of determining an application area within a user's preferred area. The user's preferred area may be determined based on records of user's editing associated with graphic data. For example, the user's preferred area may be determined based on areas to which other graphic data are moved based on a user input provided before the present point. The above-described conditions are merely examples provided to help understanding of the disclosure, and various embodiments are not limited thereto. According to an embodiment, the application area to which graphic data is to be applied may be determined to be the same for all of the selected images, or may be determined to be different from each other. For example, the processor 120 may determine area A of a first image, area A of a second image, area A of a third image, which are selected, as an application area to which graphic data is to be applied. As another example, the processor 120 may determine area A of the first image, area B of the second image, area C of a third image, which are selected, as an application area to which graphic data is to be applied. At least a part of the area B and the area C may not overlap area A, and at least a part of the area C may not overlap area B.

According to various embodiments, if a plurality of users are not present in the at least one image, the electronic device (e.g., the processor 120) may determine an application area based on a designated condition in operation 707. According to an embodiment, if a single user is present or a user is not present in the at least one image, the processor 120 may determine an application area based on a designated condition. The designated condition may be the same as described in operation 705.

According to various embodiments, the electronic device (e.g., the processor 120 and/or the display device 160 of FIG. 1) may perform displaying by applying graphic data to the determined application area in operation 709. According to various embodiments, the processor 120 may apply the determined graphic data to the application area of the at least one selected image, and may display the same.

Referring to FIGS. 8A, 8B and 8C, the processor 120 may apply graphic data 801, 811, and 821 to a determined application area in at least one selected image, and may display the same.

According to various embodiments, the electronic device (e.g., the processor 120 and/or the display device 160) may add an indicator associated with graphic data to a timeline in operation 711. According to an embodiment, when editing the video content, the processor 120 may add an indicator indicating that graphic data is applied, to a point, which corresponds to at least one image to which the graphic data is applied, on the timeline of the video content, and may perform control so as to display the added indicator. According to an embodiment, the indicator may indicate the graphic data type of graphic data that is applied to at least one image of a corresponding point in time.

Referring to FIGS. 8D and 8E, the processor 120 may add indicators in different forms on a timeline 831 of a video content, so as to indicate the graphic data type of graphic data applied to at least one image of a corresponding point in time. For example, the processor 120 may add indicators associated with the graphic data type of the applied graphic data to a timeline, such as a calendar-shaped icon, a clock-shaped icon, a phone-shaped icon, or a map-shaped icon. According to an embodiment, indicators may be the same irrespective of the graphic data type of graphic data applied to at least one image of a corresponding point in time. For example, the processor 120 may add indicators 845 in the same form to the timeline 831 of the video content, irrespective of the graphic data type of applied graphic data, as illustrated in FIG. 8E. According to embodiments, an indicator may be added at the point in time at which a timeline is generated, as opposed to the point in time at which graphic data is applied. In this instance, operation 711 may be omitted, and an operation of adding an indicator may be performed as a part of operation 715. For example, in the case of editing a recorded video, since a timeline associated with the video content may exist, the processor 120 may add an indicator related to graphic data to a corresponding point on the timeline at every point at which graphic data is applied. As another example, in the case of real-time broadcasting or real-time video call, a timeline is generated at a point in time at which broadcasting or a video call is ended. Accordingly, the processor 120 may add at least one indicator associated with at least one graphic data to the timeline, at a point in time at which the broadcasting or video call is ended and a video content of the broadcasting or video call is stored.

According to various embodiments, the electronic device (e.g., the processor 120) may determine whether a storage event occurs in operation 713. For example, the processor 120 may determine whether an edited video storage event, a real-time broadcasting end event, or a video call end event occurs. The real-time broadcasting end event, and/or video call end event may include an event of storing a related video content.

According to various embodiments, if a storage event occurs, the electronic device (e.g., the processor 120 and/or a memory (e.g., the memory 130 of FIG. 1)) may store a video content including an image combined with graphic data, in operation 715. For example, the processor 120 may store an edited video content, or may store a video content obtained during real-time broadcasting or video call. According to an embodiment, the processor 120 may perform operation 711 when a video content is stored. For example, when real-time broadcasting or video call is ended, the processor 120 may generate a video content including a plurality of images and voice signals obtained during real-time broadcasting or video call, may generate a timeline associated with the video content, and may add an indicator associated with graphic data on the timeline as shown in operation 711. The processor 120 may store the video content which includes the timeline to which an indicator is added.

Figure 9:
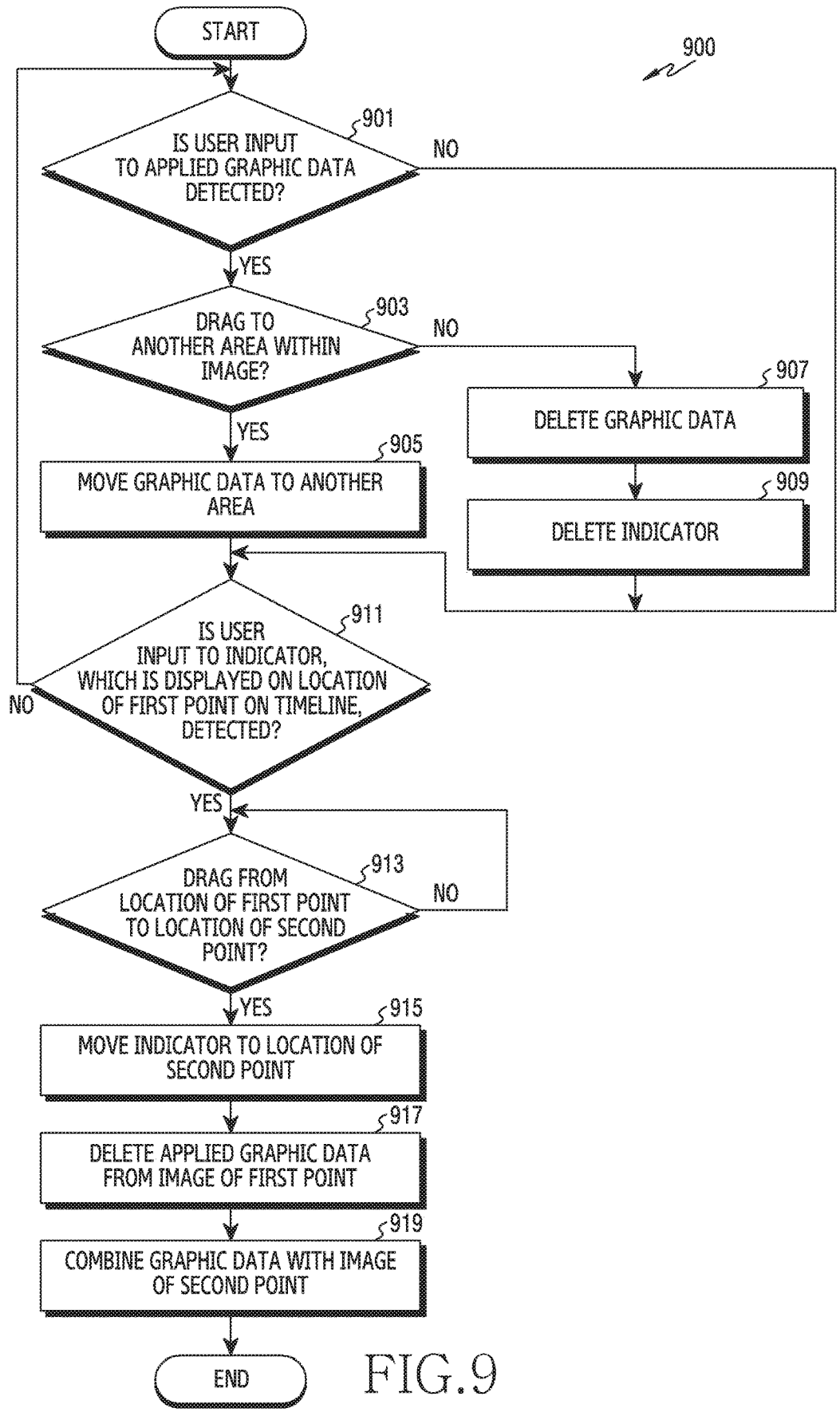
FIG. 9 is a flowchart illustrating a process of editing graphic data applied to a video content, by an electronic device according to an embodiment of the disclosure.

FIG. 9 is a flowchart illustrating a process of editing graphic data applied to a video content, by an electronic device according to an embodiment of the disclosure. Operations of FIG. 9 described hereinafter may be at least a part of the detailed operations of operation 207 of FIG. 2, or may be additionally included in FIG. 7. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1. Hereinafter, at least some operations of FIG. 9 will be described with reference to FIGS. 10A and 10B.

Figure 10A:
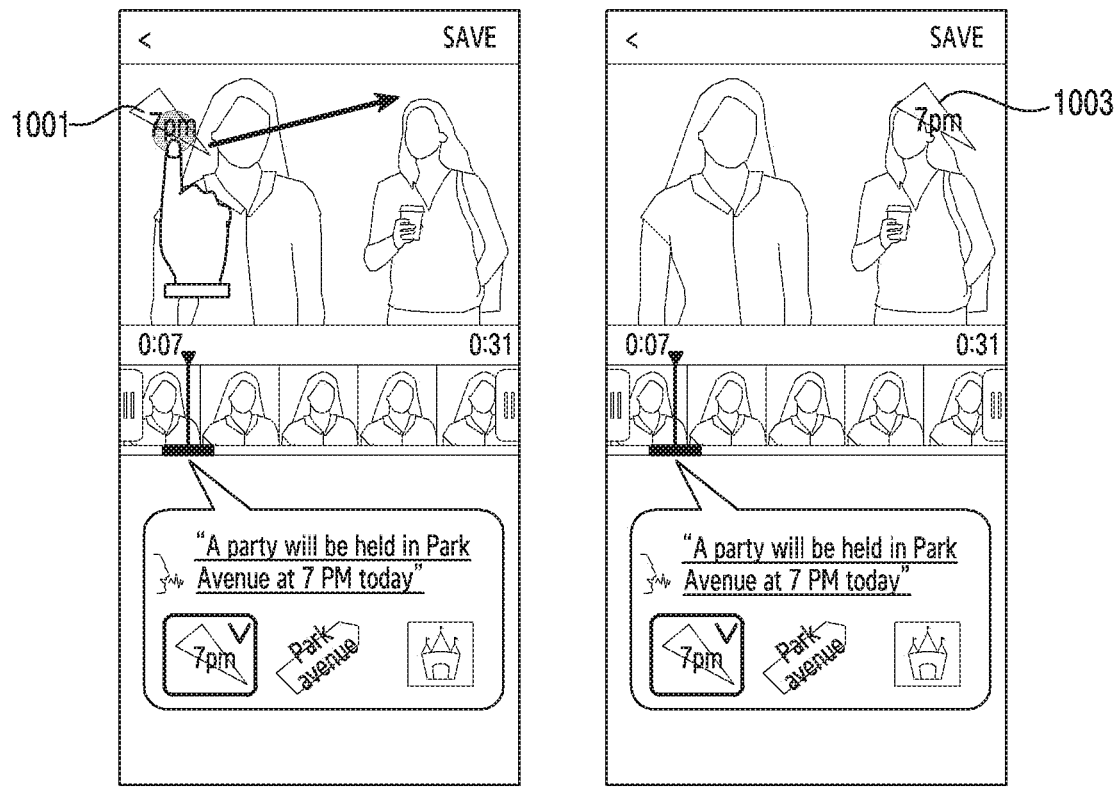
FIG. 10A is a diagram illustrating an example of a screen configuration of editing graphic data applied to a video content, by an electronic device according to an embodiment of the disclosure.

FIG. 10A is a diagram illustrating an example of a screen configuration of editing graphic data applied to a video content, by an electronic device according to an embodiment of the disclosure.

Figure 10B:
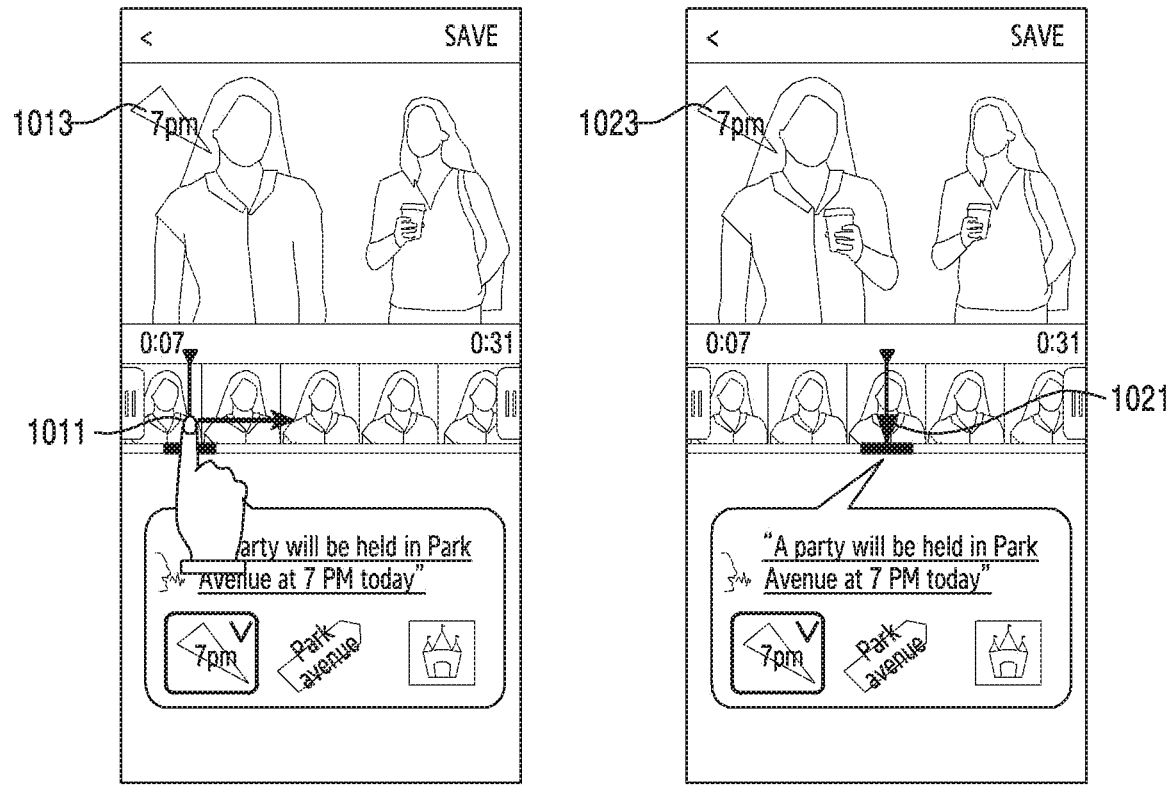
FIG. 10B is a diagram illustrating an example of a screen configuration of editing graphic data applied to a video content, by an electronic device according to an embodiment of the disclosure.

FIG. 10B is a diagram illustrating an example of a screen configuration of editing graphic data applied to a video content, by an electronic device according to an embodiment of the disclosure.

Referring to FIG. 9 and the flowchart 900, an electronic device (e.g., the processor 120 of FIG. 1) according to various embodiments may determine whether a user input to applied graphic data is detected in operation 901. According to an embodiment, after graphic data is applied to an application area of at least one image as illustrated in operation 709 of FIG. 7, the processor 120 may determine whether a user input to the applied graphic data is detected. For example, the processor 120 may determine whether a user input that moves graphic data from the application area to another area is detected.

According to various embodiments, the electronic device (e.g., the processor 120) may determine whether the detected user input drags to another area in the image in operation 903. For example, the processor 120 may determine whether a user input moves within an area where at least one image, which is being reproduced or emitted, is displayed, or moves to another area which is different from the area where at least one image, which is being reproduced or emitted, is displayed. The other area, which is different from the area where at least one image, which is being reproduced or emitted, is displayed, may include at least one of a chat information display area, a state information display area, or a menu display area. This is merely an example, and various embodiments are not limited thereto.

According to various embodiments, if the detected user input drags to another area in the image, the electronic device (e.g., the processor 120) may move graphic data to the other area, based on the user input dragging, in operation 905.

Referring to FIG. 10A, in the case of editing a recorded video content, after a user input to graphic data 1001 displayed in an application area of at least one image is detected, if the user input drags to another area in the preview area 501, the processor 120 may move graphic data to the other area corresponding to the drag, and may display the same as shown in diagram 1003.

According to various embodiments, if the detected user input does not drag to another area within the image (but drags to an area outside the image), the electronic device (e.g., the processor 120) may delete the applied graphic data, at which the user input is detected, from the at least one corresponding image in operation 907. Referring to FIG. 10A, in the case of editing a recorded video content, after a user input to the graphic data 1001 displayed in an application area of at least one image is detected, if the user input drags to another area outside the preview area 501, the processor 120 may delete (or remove) graphic data 1001 applied to the at least one image from the at least one image. According to an embodiment, in the state in which first graphic data is applied to a plurality of successive images, if a user input to the first graphic data drags to another area outside a preview area, the processor 120 may delete the first graphic data from the plurality of images.

According to various embodiments, the electronic device (e.g., the processor 120) may delete an indicator corresponding to the deleted graphic data from the timeline in operation 909. For example, the processor 120 may delete the indicator corresponding to the deleted graphic data from the timeline, so as to indicate that graphic data applied to at least one image at a corresponding point in time does not exist.

According to various embodiments, the electronic device (e.g., the processor 120) may determine whether a user input to an indicator, which is displayed on the location of a first point on the timeline, is detected in operation 911. For example, the processor 120 may determine whether a touch input to an indicator, which is displayed on the location of the first point on the timeline, is detected.

According to various embodiments, if a user input to the indicator, which is displayed on the location of the first point, is detected, the electronic device (e.g., the processor 120) may determine whether the user input drags from the location of the first point to the location of a second point, in operation 913. For example, after a touch input to the indicator, which is displayed on the location of the first point on the timeline, is detected, the processor 120 may determine whether the detected touch input moves to the location of the second point on the timeline, in the state in which the touch input is being held.

Referring to 10B, according to various embodiments, if the user input drags from the location of the first point to the location of the second point, the electronic device (e.g., the processor 120) may move the indicator to the location of the second point in operation 915. For example, if a touch to an indicator 1011, which is displayed on a first point on a timeline, is detected, and the touch drags to the location of a second point, the processor 120 may move the indicator to the location of the second point and may display the same as shown by indicator 1021.

According to various embodiments, the electronic device (e.g., the processor 120) may delete the graphic data applied to an image at the first point in operation 917, and may apply the graphic data to an image at the second point in operation 919. According to an embodiment, the processor 120 may change the image combined with the graphic data corresponding to the indicator from at least one image of the first point to at least one image of the second point, based on the point in time at which the indicator is moved. For example, as illustrated in FIG. 10B, the processor 120 may delete graphic data 1013 corresponding to the indicator 1011 from at least one image corresponding to the first point, and may apply graphic data 1023 corresponding to an indicator 1021, which is moved, to at least one image corresponding to the second point.

Figure 11:
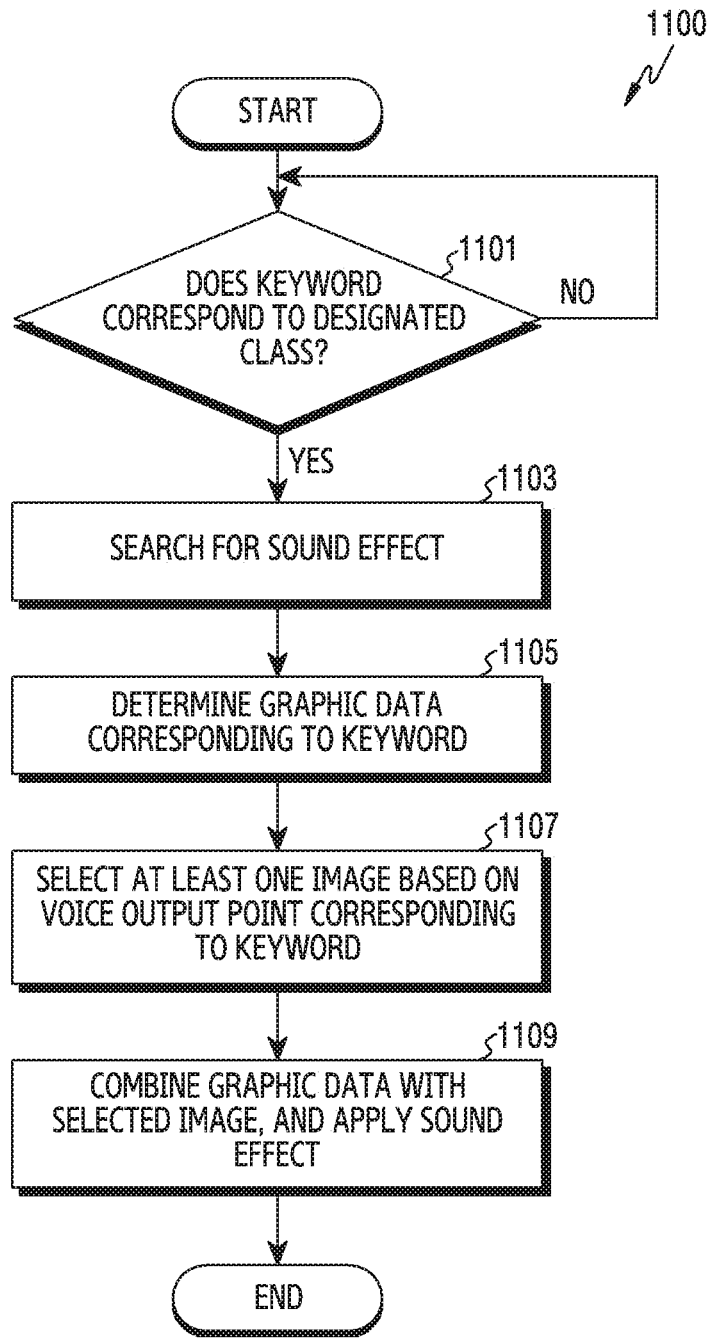
FIG. 11 is a flowchart illustrating a process of providing graphic data and a sound effect, based on a voice signal of a video content, by an electronic device according to an embodiment of the disclosure.

FIG. 11 is a flowchart illustrating a process of providing graphic data and a sound effect, based on a voice signal of a video content, by an electronic device according to an embodiment of the disclosure. Operations of FIG. 11 described hereinafter may be at least a part of the detailed operations of operation 203, 205, and 207 of FIG. 2. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1.

Referring to FIG. 11 and flowchart 1100, an electronic device (e.g., the processor 120 of FIG. 1) according to various embodiments may determine whether an obtained keyword corresponds to a designated class in operation 1101. According to an embodiment, the processor 120 may obtain a keyword as illustrated in operation 201 of FIG. 2 or FIG. 3. For example, the processor 120 may determine whether an obtained keyword is a keyword corresponding to a class designated as slang. The designated class may be set and/or changed by an operator and/or a user.

According to various embodiments, if the obtained keyword is a keyword corresponding to the designated class, the electronic device (e.g., the processor 120) may search for and/or determine a sound effect in operation 1103. According to an embodiment, the processor 120 may search for a sound effect corresponding to the designated class, among sound effects stored in advance in the memory (e.g., the memory 130 of FIG. 1). For example, if the obtained keyword corresponds to slang, the processor 120 may search for a sound effect related to slang. According to an embodiment, the processor 120 may communicate with any one of the external devices (the electronic device 102, the electronic device 104, or the server 108 of FIG. 1), and may search for and/or determine a sound effect corresponding to a designated class.

According to various embodiments, the electronic device (e.g., the processor 120) may determine graphic data corresponding to the keyword in operation 1105. According to an embodiment, the processor 120 may search for recommended graphic data corresponding to the keyword that corresponds to the designated class, and may automatically determine the retrieved recommended graphic data as graphic data to be applied. According to an embodiment, the processor 120 may determine graphic data corresponding to the keyword, as illustrated in operation 203 of FIG. 2 and/or FIG. 4.

According to various embodiments, the electronic device (e.g., the processor 120) may select at least one image based on the point in time at which a voice corresponding to the keyword is output in operation 1107. According to an embodiment, the processor 120 may select at least one image based on the point in time at which a voice corresponding to the keyword of the designated class is output. According to an embodiment, the processor 120 may select at least one image, as illustrated in operation 205 of FIG. 2 and/or FIG. 6.

According to various embodiments, the electronic device (e.g., the processor 120, the display device 160 of FIG. 1, and/or the sound output device 155 of FIG. 1) may apply graphic data to the selected image, and apply a sound effect in operation 1109. According to an embodiment, the processor 120 may apply and display the graphic data as illustrated in operation 207 of FIG. 2 and/or FIG. 7, and may perform control so as to apply the sound effect determined in operation 1103. For example, if an obtained keyword corresponds to slang, the processor 120 may perform control so as to output a sound effect related to slang at the point in time at which the slang is output. According to an embodiment, in the case of editing a recorded video, the processor 120 may record a sound effect in the location in which at least a part of the slang is recorded. According to an embodiment, in the case of real-time broadcasting or video call, the processor 120 may perform control so that at least a part of slang is not transmitted to an external device, and a sound effect is transmitted to the external device instead of at least the part of the slang.

Figure 12:
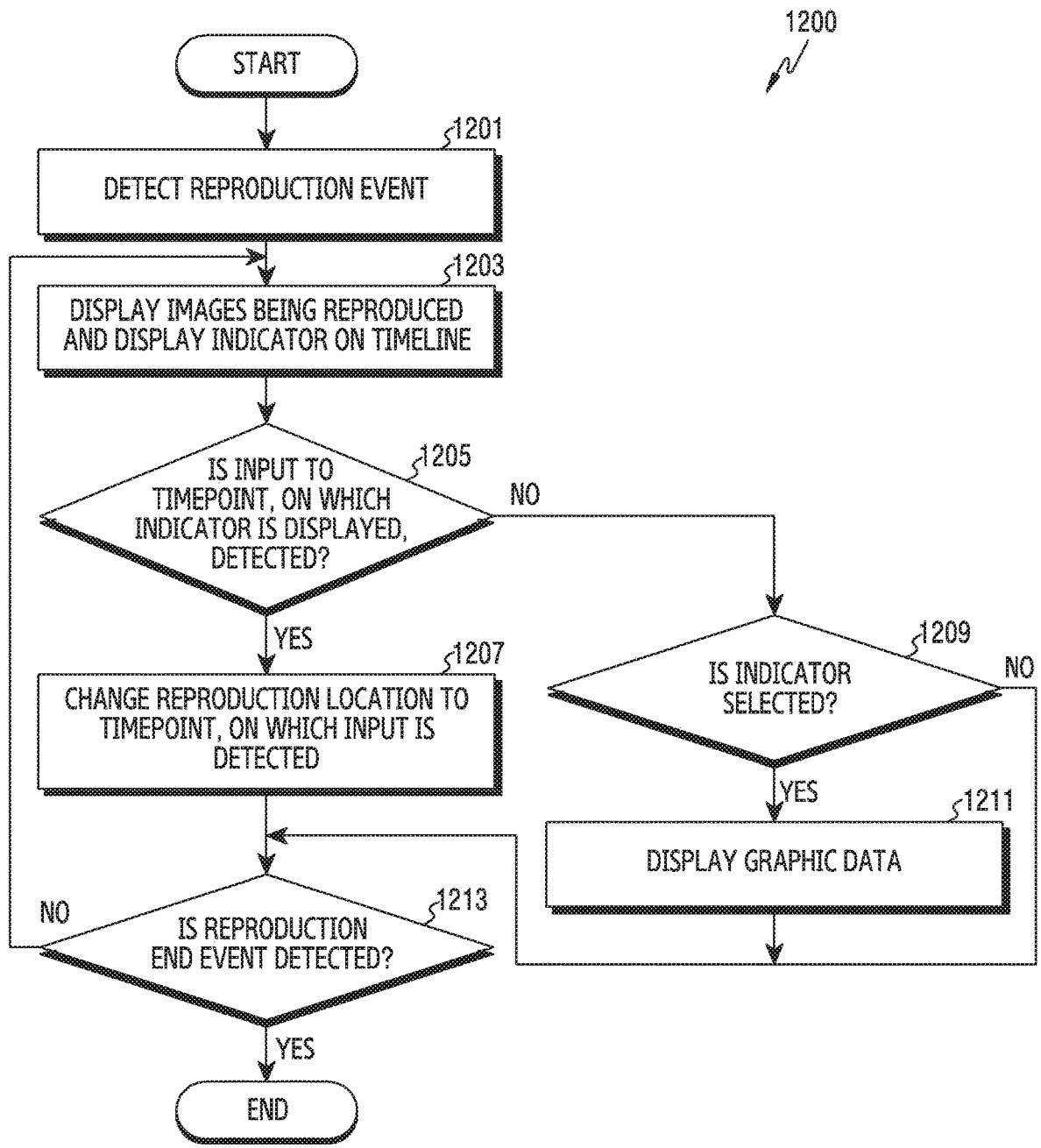
FIG. 12 is a flowchart illustrating a process of providing graphic data using an indicator, when a video content is reproduced, by an electronic device according to an embodiment of the disclosure.

FIG. 12 is a flowchart illustrating a process of providing graphic data using an indicator, when a video content is reproduced, by an electronic device according to an embodiment of the disclosure. Operations of FIG. 12 which are described below may be operations subsequent to operation 207 of FIG. 2. In the embodiment provided hereinafter, operations may be performed sequentially, but it is not necessarily limited thereto. For example, the order of operations may be changed, and at least two operations may be performed in parallel. Here, an electronic device may be the electronic device 101 of FIG. 1. Hereinafter, at least some operations of FIG. 12 will be described with reference to FIGS. 13A and 13B.

Figure 13A:
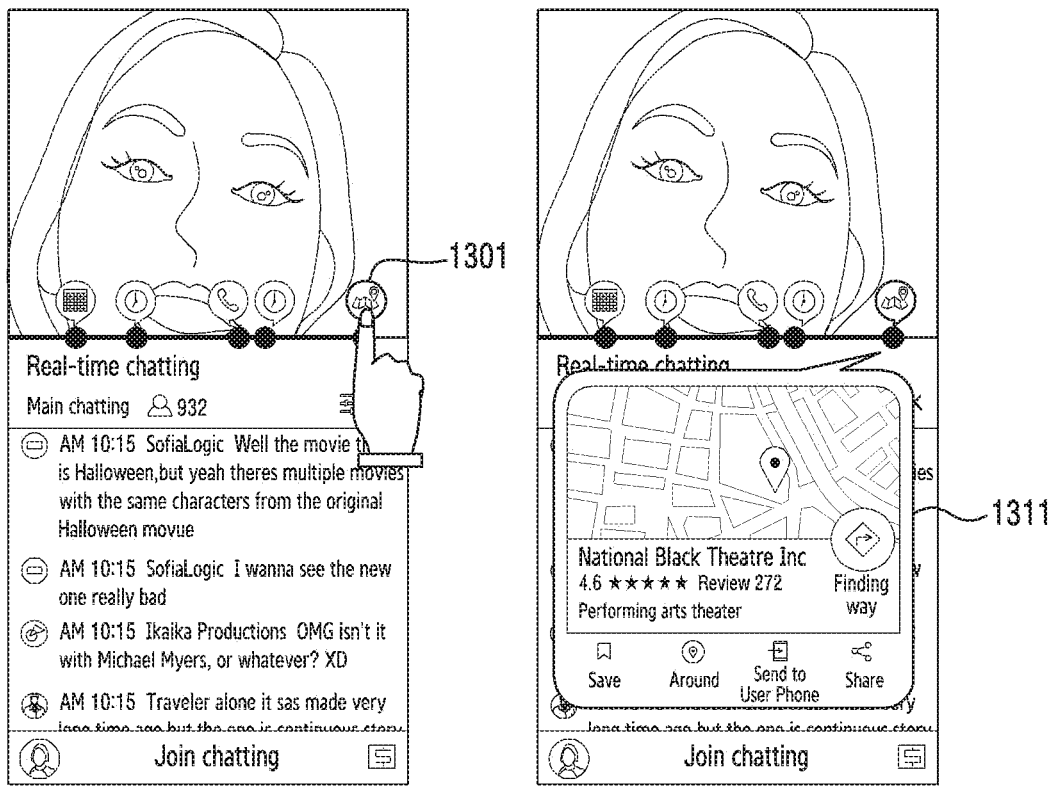
FIG. 13A is a diagram illustrating an example of a screen configuration of providing graphic data using an indicator of a video content, by an electronic device according to an embodiment of the disclosure.

FIG. 13A is a diagram illustrating an example of a screen configuration of providing graphic data using an indicator of a video content, by an electronic device according to an embodiment of the disclosure.

Figure 13B:
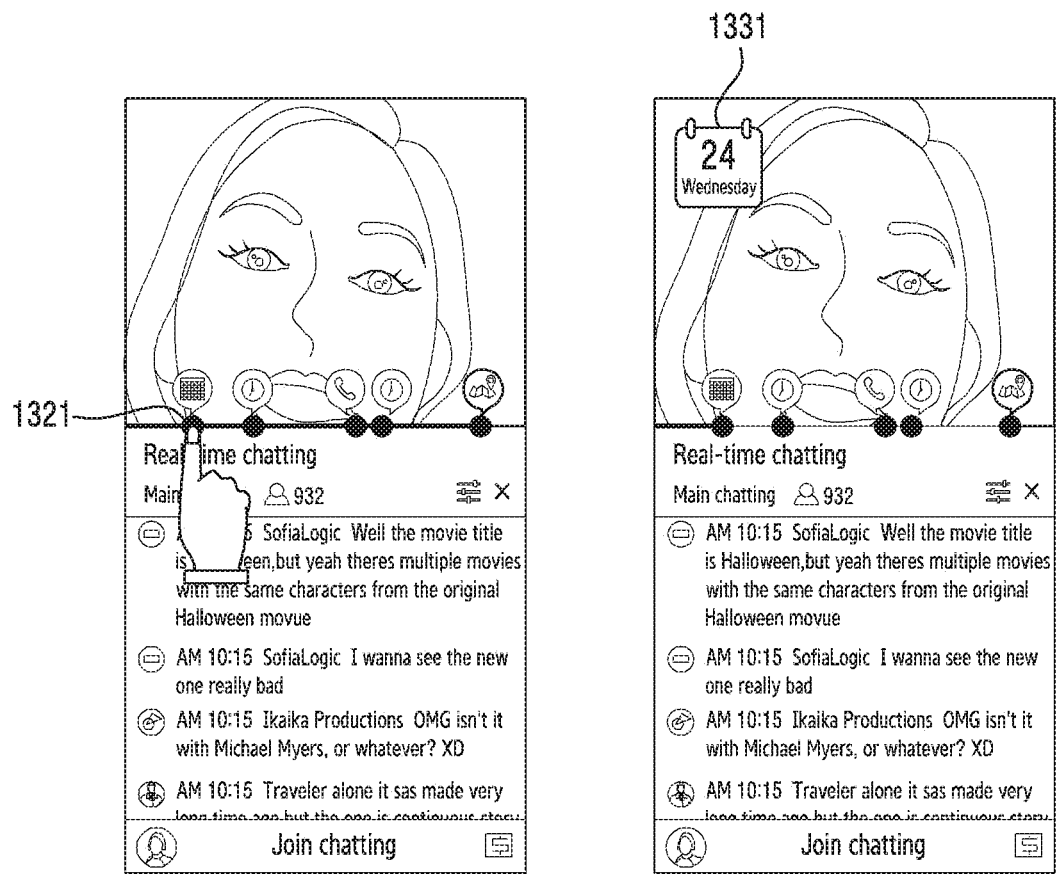
FIG. 13B is a diagram illustrating an example of a screen configuration of providing graphic data using an indicator of a video content, by an electronic device according to an embodiment of the disclosure.

FIG. 13B is a diagram illustrating an example of a screen configuration of providing graphic data using an indicator of a video content, by an electronic device according to an embodiment of the disclosure.

Referring to FIG. 12 and flowchart 1200, an electronic device (e.g., the processor 120 of FIG. 1) according to various embodiments may detect an event of reproducing a video content in operation 1201. The video content may include at least one of a recorded video content, an edited video content, a content stored after real-time broadcasting, or a content stored after video call.

According to various embodiments, the electronic device (e.g., the processor 120, and/or the display device 160) may successively display a plurality of images when the video content is reproduced, and may display at least one indicator on a timeline indicating a reproduction point of the video content in operation 1203. According to an embodiment, at least one of the plurality of images may be an image combined with graphic data. According to an embodiment, the indicator may be an indicator indicating the location of reproduction (or reproduction point) of at least one image combined with graphic data.

According to various embodiments, the electronic device (e.g., the processor 120) may determine whether an input to a point, on which the indicator is displayed, is detected in operation 1205. For example, the processor 120 may determine whether a touch input to a predetermined point on the timeline, on which at least one indicator is displayed, is detected, while the video content is being reproduced.

According to various embodiments, if an input to the point, on which an indicator is displayed, is not detected, the electronic device (e.g., the processor 120) may determine whether a user touch input to the indicator, which is displayed on the timeline, is detected while the video content is being reproduced, in operation 1209.

Referring to 13A, according to various embodiments, if a user touch input to the indicator is detected, the electronic device (e.g., the processor 120 and/or the display device 160) may display graphic data corresponding to the indicator, on which the user touch input is detected, in operation 1211. Referring to FIG. 13A, if a user touch input to a first indicator 1301 is detected, the processor 120 may continue to reproduce a video content, and may display graphic data 1311 corresponding to the first indicator 1301 in at least a part of the display.

Referring to 13B, according to various embodiments, if an input to the point, on which the indicator is displayed, is detected, the electronic device (e.g., the processor 120) may change the location of reproduction (or a reproduction point) of the video content to the point, on which the input is detected, in operation 1207. Referring to FIG. 13B, if a touch input to a first point 1321 on a timeline, on which a second indicator is displayed, is detected the processor 120 may change the reproduction point of the video content to the first point 1321, and may successively display a plurality of images corresponding to the changed reproduction point. At least one image of the plurality of images corresponding to the changed reproduction point may be an image to which graphic data 1331 corresponding to the second indicator is applied.

According to various embodiments, the electronic device (e.g., the processor 120) may determine whether an event of stopping reproduction of the video content occurs, in operation 1213. The reproduction stop event associated with the video content may include a reproduction stop event by a user, or a video content reproduction complete event. According to an embodiment, if the reproduction stop event associated with the video content does not occur, the processor 120 may return to operation 1203 and continue to reproduce the video content.

According to various embodiments, an operation method of the electronic device 101 may include: obtaining at least one keyword from a voice signal related to a plurality of images; determining at least one graphic data corresponding to the at least one keyword; selecting at least one image among the plurality of images, based on a point in time at which a voice corresponding to a keyword that corresponds to the determined graphic data is output; and performing control so as to apply the determined graphic data to the at least one selected image.

According to various embodiments, the operation method of the electronic device 101 may further include: adding, to a video content including the plurality of images, an indicator indicating a reproduction point of at least one image to which the graphic data is applied, and the indicator may be displayed on a timeline of the video content.

According to various embodiments, the operation of determining the at least one graphic data may include: determining at least one recommended graphic data corresponding to the at least one keyword; providing a user interface including the at least one determined recommended graphic data; and determining, based on an input, graphic data to be applied to the at least one selected image among the at least one recommended graphic data, and the input may include at least one of a touch input, a gesture input, or a voice input.

According to various embodiments, the operation of determining the graphic data based on the input may include: determining whether the input is detected within a threshold time from a point in time at which the user interface is provided; and if the input is not detected within the threshold time, automatically determining graphic data to be applied to the at least one selected image among the at least one recommended graphic data, based on at least one of a user's preference, the priority of the at least one keyword, the priority of the at least one recommended graphic data, or context based on the voice signal.

According to various embodiments, the operation method of the electronic device may include: determining whether the at least one keyword corresponds to a designated class; if the at least one keyword corresponds to the designated class, determining a sound effect corresponding to the at least one keyword; and performing control so as to apply the sound effect at a point in time at which a voice signal corresponding to the at least one keyword is output.

According to various embodiments, the operation of performing control so as to apply the determined graphic data, may include: determining whether a plurality of user are included in the at least one selected image; if the plurality of users are included, identifying a user who outputs a voice corresponding to a keyword that corresponds to the determined graphic data among the plurality of users; determining an application area to which the determined graphic data is to be applied, based at least on an area where the identified user is located in the at least one selected image; and applying the determined graphic data to the application area of the at least one selected image.

According to various embodiments, the operation of performing control so as to apply the determined graphic data may further include; changing the application area for the graphic data in an area of the at least one selected image, based on a drag input associated with the applied graphic data.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising: a display; a camera; an input device;
    and a processor, wherein the processor is configured to:
    obtain a real-time video broadcast or a video call comprising a plurality of images from the camera, obtain a voice signal related to the real-time video broadcast or the video call comprising the plurality of images from the input device and convert the voice signal to text, and extract at least one keyword from the text of the voice signal, determine at least one recommended graphic data corresponding to the at least one keyword, display a user interface including the text and the at least one recommended graphic data on the display, determine a graphic data to be applied among the at least one recommended graphic data, based on: a user input on the at least one recommended graphic data on the display when an automatic combination function has not been previously activated, and a priority of the at least one keyword without any user input when the automatic combination function has been previously activated, select at least one image of the plurality of images, based on a point in time at which a voice corresponding to a keyword that corresponds to the determined graphic data is output, and apply the determined graphic data to the at least one selected image within the real-time video broadcast or the video call.

2. The electronic device of claim 1, wherein the processor is further configured to add, to the real-time video broadcast or the video call comprising the plurality of images, an indicator indicating the point in time at which the at least one selected image to which the graphic data is applied.

3. The electronic device of claim 2, wherein the indicator is displayed on a timeline of the real-time video broadcast or the video call.

4. The electronic device of claim 3, wherein the processor is further configured to add the indicator to the timeline, at the point in time at which the graphic data is applied to the at least one selected image, or at the point in time at which the real-time video broadcast or the video call comprising the plurality of images is stored.

5. The electronic device of claim 3, wherein the processor is further configured to: when a drag input to the indicator displayed on the timeline is detected, change the point in time at which the at least one selected image to which the graphic data is applied indicated by the indicator on the timeline to a second point on the timeline, based on the drag input, delete graphic data associated with the indicator from at least one image corresponding to the point in time at which the at least one selected image to which the graphic data is applied, and
    apply the graphic data associated with the indicator to at least one other image corresponding to the second point.

6. The electronic device of claim 1, wherein the user input comprises at least one of a touch input, a gesture input, or a voice input.

7. The electronic device of claim 1, wherein the processor is further configured to:
    determine whether the at least one keyword corresponds to a designated class,
    if the at least one keyword corresponds to the designated class, determine a sound effect corresponding to the at least one keyword, and
    apply the sound effect at the the point in time at which a voice signal corresponding to the at least one keyword is output.

8. An operation method of an electronic device, the method comprising:
    obtaining a real-time video broadcast or a video call comprising a plurality of images from a camera; obtaining a voice signal related to the real-time video broadcast or the video call comprising the plurality of images from an input device and converting the voice signal to text; extracting at least one keyword from the text of the voice signal; determining at least one recommended graphic data corresponding to the at least one keyword; displaying a user interface including the text and the at least one recommended graphic data on a display of the electronic device; determining a graphic data to be applied among the at least one recommended graphic data, based on: a user input on the at least one recommended graphic data on the display when an automatic combination function has not been previously activated, and a priority of the at least one keyword without any user input when the automatic combination function has been previously activated; selecting at least one image among the plurality of images, based on a point in time at which a voice corresponding to a keyword that corresponds to the determined graphic data is output; and applying the determined graphic data to the at least one selected image within the real-time video broadcast or the video call.

9. The method of claim 8, further comprising: adding, to the real-time video broadcast or the video call comprising the plurality of images, an indicator indicating the point in time at which the at least one selected image to which the graphic data is applied, wherein the indicator is displayed on a timeline of the real-time video broadcast or the video call comprising the plurality of images.

10. The method of claim 8, wherein the user input comprises at least one of a touch input, a gesture input, or a voice input.

11. The method of claim 8, further comprising: determining whether the at least one keyword corresponds to a designated class; when the at least one keyword corresponds to the designated class, determining a sound effect corresponding to the at least one keyword; and applying the sound effect at the point in time at which a voice signal corresponding to the at least one keyword is output.

\* \* \* \* \*